United States Patent
Yoshikawa

(10) Patent No.: US 6,597,471 B1
(45) Date of Patent: Jul. 22, 2003

(54) INFORMATION PROCESSING APPARATUS, ITS CONTROL METHOD, AND MEMORY MEDIUM

(75) Inventor: Naohiro Yoshikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/475,177

(22) Filed: Dec. 30, 1999

(30) Foreign Application Priority Data

Jan. 12, 1999 (JP) ............................................. 11-005777
Dec. 1, 1999 (JP) ............................................. 11-342554

(51) Int. Cl.⁷ ............................................. G06F 15/00
(52) U.S. Cl. ....................... 358/1.2; 358/1.16; 358/1.17
(58) Field of Search .................... 358/1.2, 1.5, 1.12, 358/1.14, 1.15, 1.16, 1.17, 447, 451, 298, 1.18

(56) References Cited

U.S. PATENT DOCUMENTS 5,552,894 A * 9/1996 Aiba ........................... 358/298
5,841,552 A * 11/1998 Atobe et al. ................. 358/447
6,389,159 B2 * 5/2002 Gilman et al. .............. 382/162

* cited by examiner

Primary Examiner—Mark Wallerson
(74) Attorney, Agent, or Firm—Fitzpatrick, Cella, Harper & Scinto

(57) ABSTRACT

In the case where an image exists in text data as a print target, it is an object of the invention to allow a quality of data that is outputted to a printer to be designated as print data corresponding to the image. Image data is stored every different resolution, and in the case where there is the image data in the text whose print has been instructed from an application program, the image data of the resolution according to the designated print quality is selected. The selected image data is outputted to the printer by a predetermined format.

36 Claims, 18 Drawing Sheets

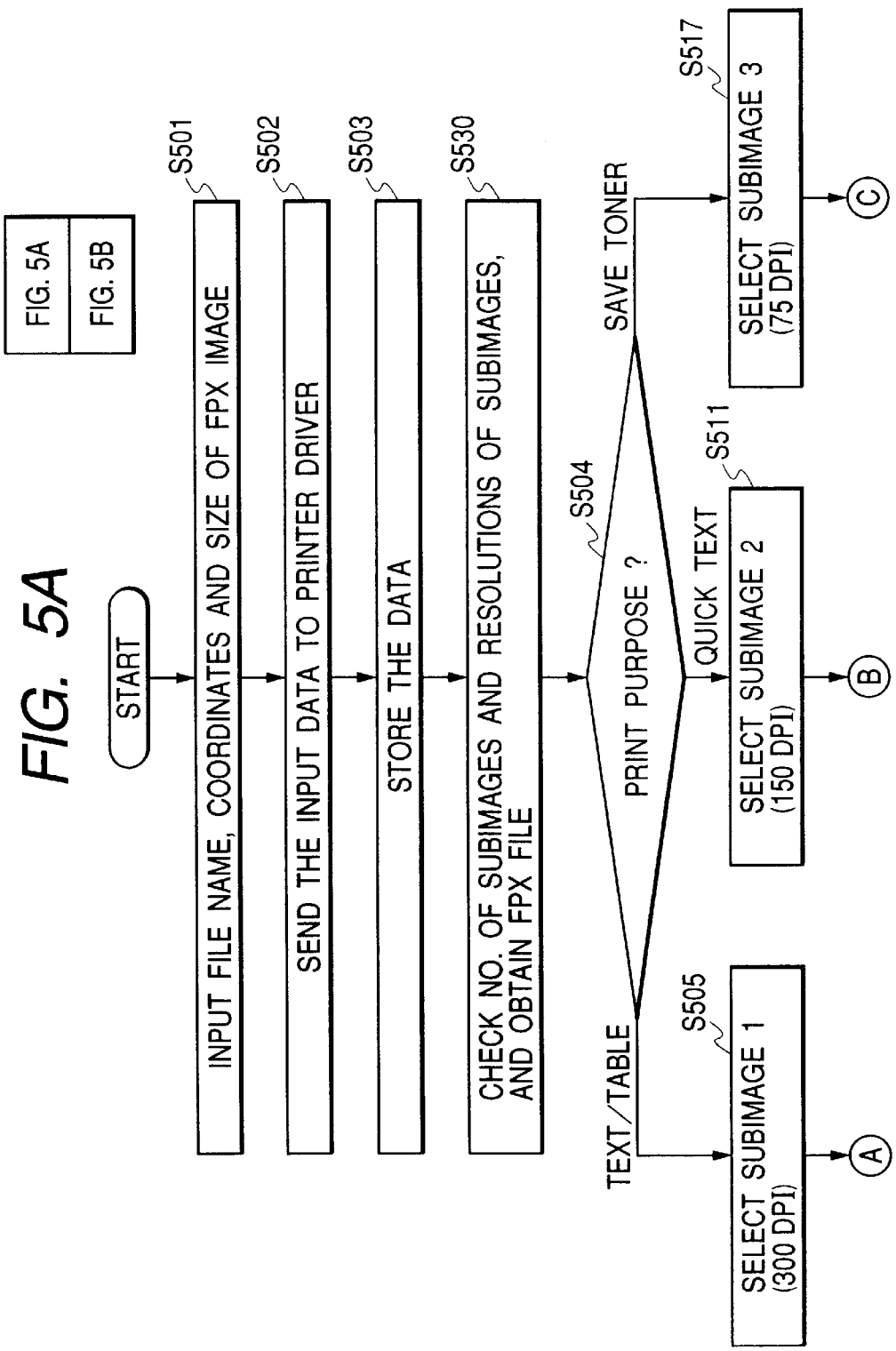

FIG. 12

| Property Name | ID Code | Type |
|---|---|---|
| Number Of Resolutions | 0x01000000 | VT_U14 |
| Highest Resolution Width | 0x01000002 | VT_U14 |
| Highest Resolution Height | 0x01000003 | VT_U14 |
| Default Display Height | 0x01000004 | VT_R4 |
| Default Display Width | 0x01000005 | VT_R4 |
| Display Height/Width Units | 0x01000006 | VT_U14 |

| Property Name | ID Code | Type |
|---|---|---|
| Subimage Width | 0x02//0000 | VT_U14 |
| Subimage Height | 0x02//0001 | VT_U14 |
| Subimage Color | 0x02//0002 | VT_BLOB |
| Subimage Numerical Format | 0x02//0003 | VT_U14 \| VT_VECTOR |
| Decimation Method | 0x02//0004 | VT_14 |
| Decimation Prefilter Width | 0x02//0005 | VT_R4 |
| Subimage ICC Profile | 0x02//0007 | VT_U12 \| VT_VECTOR |

| Property Name | ID Code | Type |
|---|---|---|
| JPEG Tables | 0x03//0001 | VT_BLOB |
| Maximum JPEG Table Index | 0x03000002 | VT_U14 |

FIG. 13

| Field Name | Length | Byte(s) |
|---|---|---|
| Length Of Header Stream Header | 4 | 0—3 |
| Image Width | 4 | 4—7 |
| Image Height | 4 | 8—11 |
| Number Of Tiles | 4 | 12—15 |
| Tile Width | 4 | 16—19 |
| Tile Height | 4 | 20—23 |
| Number Of Channels | 4 | 24—27 |
| Offset To Tile Header Table | 4 | 28—31 |
| Length Of Tile Header Entry | 4 | 32—35 |
| Tile Header Table | Variable | Variable |

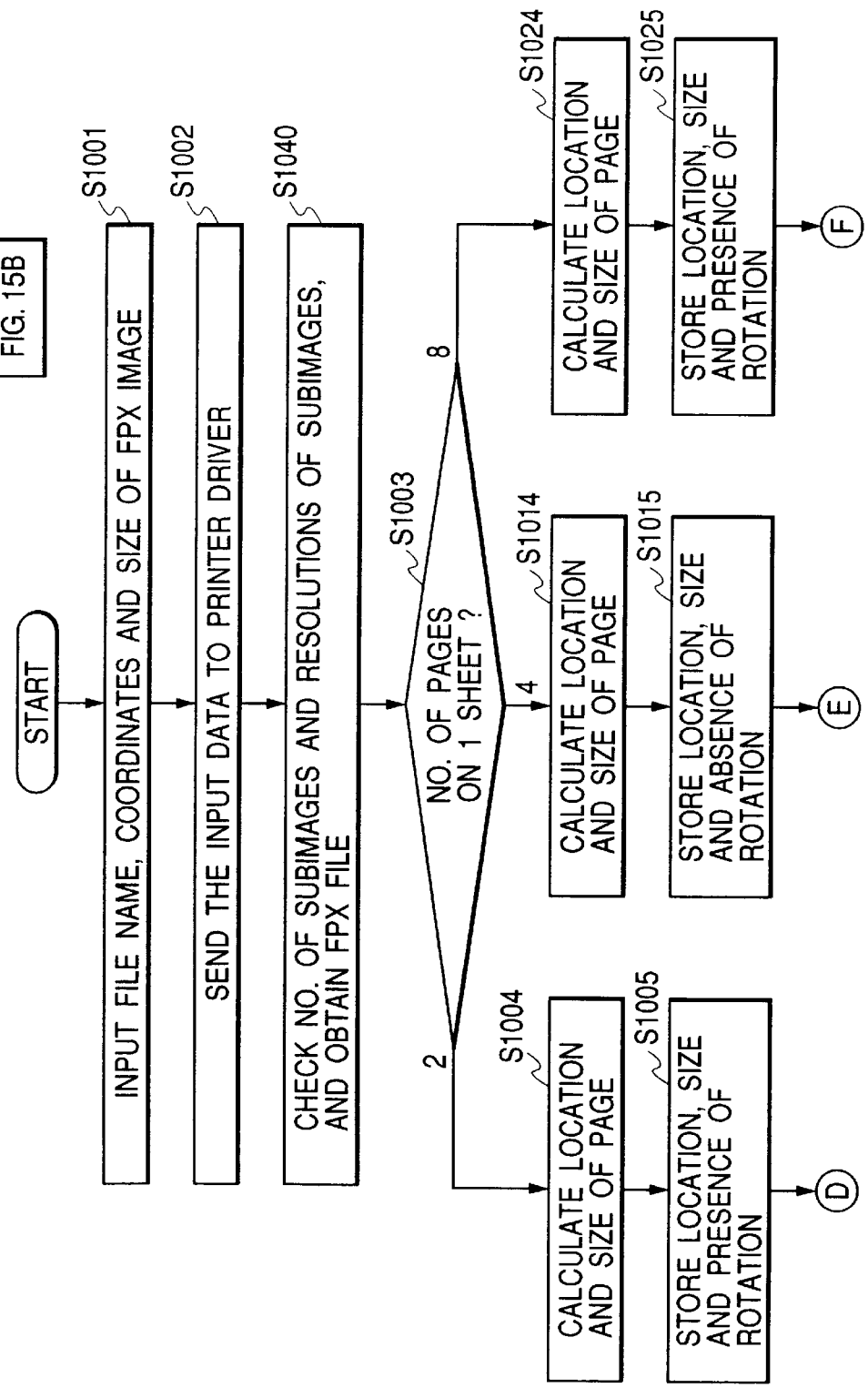

FIG. 16

| | |
|---|---|
| NO. OF SUBIMAGES | 1602 |
| RESOLUTION OF SUBIMAGE 1 | 1603 |
| RESOLUTION OF SUBIMAGE 2 | 1604 |
| ⋮ | |
| RESOLUTION OF SUBIMAGE n | 1605 |
| WIDTH/HEIGHT OF SUBIMAGE 1 | 1611 |
| NO. OF BITS PER PIXEL OF SUBIMAGE 1 | 1612 |
| DATA SIZE OF SUBIMAGE 1 | 1613 |
| DATA OF SUBIMAGE 1 | 1614 |
| WIDTH/HEIGHT OF SUBIMAGE 2 | 1621 |
| NO. OF BITS PER PIXEL OF SUBIMAGE 2 | 1622 |
| DATA SIZE OF SUBIMAGE 2 | 1623 |
| DATA OF SUBIMAGE 2 | 1624 |
| ⋮ | |
| WIDTH/HEIGHT OF SUBIMAGE n | 1631 |
| NO. OF BITS PER PIXEL OF SUBIMAGE n | 1632 |
| DATA SIZE OF SUBIMAGE n | 1633 |
| DATA OF SUBIMAGE n | 1634 |

INFORMATION PROCESSING APPARATUS, ITS CONTROL METHOD, AND MEMORY MEDIUM

BACKGROUND OF THE INVENTION

1. Field of the Invention

The invention relates to an information processing apparatus for generating print data which can be interpreted by a printer and relates to a control method of such an apparatus and a printer driver that is stored in a memory medium. More particularly, the invention relates to a process for generating print data obtained by transforming image data in print data to print data of a resolution suitable for a printing process.

2. Related Background Art

First, a construction of a functional module, a procedure for a printing process, a nature of data, and a flow of the data in a conventional print system will be described with reference to FIG. 4.

In FIG. 4, reference numeral 400 denotes a host computer (for example, personal computer or the like) constructing the print system; and 410 a printer. The host computer 400 and printer 410 are connected by a communication path 409.

Reference numeral 401 denotes an application program to provide functions such as word processor, spreadsheet, and the like; and 402 indicates an operating system (OS) for intervening between the application program 401 and hardware (not shown) which is provided for the host computer 400 and servicing various processes for the application. For example, Microsoft Windows 95 ("Windows" is a registered trademark of Microsoft) is well known.

The application program 401 uses an application programming interface (API) which is provided by the operating system 402 and constructs a function to be provided by the application program (shown by an arrow 411). In case of the Windows OS, the application program 401 issues an API called a GDI (Graphic Device Interface) function.

Reference numeral 403 denotes a printer driver to generate a print command in accordance with a request from the operating system. The operating system 402 transforms the GDI function as information such as character, figure, image, or the like to be printed by the application program 401 to a DDI (Device Driver Interface) function and sends the DDI function to the printer driver (shown by an arrow 412). The printer driver 403 generates a print command (including a PDL (page description language), image data developed by the printer driver, and the like) to be sent to the printer on the basis of those information and returns it to the operating system 402 (shown by an arrow 413). The print command which is generated by the printer driver 403 conforms with a grammar of the page description language (PDL) which the printer 410 has.

As kinds of PDLS, Canon LIPS IV ("LIPS" is a trademark of Canon Inc.), Adobe PostScript ("PostScript" is a registered trademark of Adobe), for example, are known.

The operating system 402 sends the print data including the print command received from the printer driver 403 to the printer 410 via the communication path 409. The application program 401 also allows a document to be displayed on a display 421. In a manner similar to the case of printing and outputting, a GDI function is outputted to a drawer (not shown) of the operating system 402 and a display driver (not shown) draws and outputs a DDI function generated by the operating system onto a VRAM (shown by an arrow 422), so that it is displayed and outputted on the display 421. The above functional modules are provided in the host computer 400 constructing the print system.

Reference numeral 404 denotes a translator for processing the print data sent from the host computer and analyzing various print commands in accordance with the grammar of the PDL. Reference numeral 405 denotes a draw command generator to which an analysis result of the print command is inputted from the translator 404 (shown by an arrow 414). The generator 405 transforms it to a draw command and stores it in a draw command memory 406 (shown by an arrow 415). The draw command is used for rearranging draw objects in accordance with the order of drawing the print data described by the page description language onto a recording medium and adding a process for enabling a drawing process to be easily performed. For example, in case of a font, data obtained by holding an address indicative of a location in a memory where a bit map image shown by a code of the font exists or compressing a bit map obtained by developing a complicated draw object and holding the compressed bit map is called a draw command. In a page printer such that the printing process cannot be stopped on the halfway of one page, after all of the print commands of one page are completely transformed to draw commands, a desired draw command is read out from the draw command memory 406 (shown by an arrow 416) and sent to a drawer 407 (shown by an arrow 417).

Reference numeral 406 denotes the draw command memory to store the draw commands; 407 the drawer for performing a drawing process in response to the draw command inputted from the draw command generator 405 and generating a bit map image onto a bit map image generation memory (not shown); 420 an engine interface for reading out the bit map image generated by the drawer 407 (shown by an arrow 418), transferring it as a video signal to a printer engine 408 and controlling the operation of the printer engine (shown by an arrow 419); and 408 the printer engine for generating a permanent visible image onto a sheet on the basis of a control signal and a video signal which are supplied from the engine interface 420. The above functional modules are provided in the printer 410. Although a laser beam printer engine is used as an engine of a page printer in the embodiment, it is obviously possible to use any other printer engine such as printer engine of a type in which an electrostatic latent image is generated on a photosensitive drum by an LED array or the like or printer engine of a type in which an ink droplet is emitted.

A process for designating a print quality in the print system will now be described.

The conventional print system has a function such that when the user tries to perform the printing operation on the host computer (personal computer: PC) 400, a finishing quality (resolution, gradation, and the like) of a document to be printed is designated by designating a print purpose in a property of the printer driver.

For example, FIG. 1 shows an example of a picture plane which is operated when a print quality is designated in the host computer 400 for generating print data in a conventional print system. In the example, FIG. 1 shows a startup picture plane of a utility program serving as a part of a printer driver for a laser beam printer made of Canon Inc. (in many cases, in a dialog box for printing which is displayed when printing on an application, the startup picture plane is displayed in the case where a display of a property of a printer is designated).

In the diagram, reference numeral 101 denotes a whole designated picture plane to input various setting items which are set for the printer. The designated picture plane 101 is displayed as a window onto a display screen of a host computer (not shown) as necessary. Reference numeral 102 denotes a title section of the designated picture plane 101. Reference numerals 103 to 110 indicate tabs each showing symbolically a main classification of the designated item. In FIG. 1, a "main" tab to designate a print purpose is selected. Reference numeral 111 denotes an icon display area to display an icon to designate the print purpose. Reference numerals 112 to 116 indicate icons each showing a print purpose. In the diagram, a state where a "text/table" icon has been selected is shown.

Besides the text/table icon 112, DTP icon 113, quick text icon 114, quick DTP icon 115, and save toner icon 116 shown in the diagram, other print purposes can be displayed in the icon display area 111 by scrolling in the lateral direction and another desired print purpose can be further selected. However, a description in such a case is omitted.

Reference numeral 117 denotes a scroll list area where a menu of parameters which are set by selecting the icon 112 is displayed while being scrolled. In the scroll list area 117, a "graphic mode" has been set to "LIPS". "LIPS" is a PDL (page description language for printer) made by Canon Inc. The printer receives the print command described by the page description language LIPS from the host computer and prints. There is "image" as another setting. When this mode is set, the printer receives image data from the host computer and prints.

"Resolution" has been set to "fine". In such a case, the printer prints at a resolution of 600 dpi. There is "quick" as another setting. When this mode is set, the printer prints at a resolution of 300 dpi.

"Color mode" has been set to "auto". In such a case, the printer automatically adjusts a color and gamma characteristics and prints. There is "manual" as another setting. When this mode is set, the color converting process and gamma characteristics can be manually set in detail.

"Monochrome-halftone" has been set to "panel". In such a case, for a setting item showing which one of a plurality of halftone screens provided in the printer, the halftone screen set by an operation panel section of the printer (not shown) is used preferentially. There are "pattern 1" and "pattern 2" as other settings. A monochrome-halftone process is executed by the halftone screen of different specifications.

Although only the four items described above are displayed in the scroll list area 117, there are also a number of other setting items. Explanation will now be made with respect to only two items whose settings are changed by changing the print purpose among the five kinds ("text/table", "DTP", "quick text", "quick DTP", "save toner") instead of describing all of the setting items.

A setting item "substitute font" is set to "presence" when the print purpose of "text/table", "quick text", or "save toner" is selected, and it is set to "absence" when the print purpose of "DTP" or "quick DTP" is selected. "Substitute font" denotes that the printer does not use the font using character shape data of a font section of a character which is used by the host computer but substitutes a font provided in the printer. By executing the font substitution, it is sufficient to use data of a character code as data which is transmitted from the host computer to the printer. Therefore, a transfer data amount can be reduced and a high print processing speed can be realized. On the, contrary, when the font substitution is not performed, since the host computer side sends the used character shape data (dot pattern of a character) to the printer, although a transfer data amount increases, a character shape desired on the host computer side can be reflected accurately to a print result.

The setting item "save toner" is set to "use" in case of the print purpose "save toner" and set to "panel" in the other cases. "Save toner" denotes that the dots to be printed black are decimated in accordance with a predetermined rule to thereby suppress a toner consumption quantity.

On the other hand, in case of printing an image (photograph image or the like) to a document to be printed in the conventional print system, the host computer designates coordinates, a width, a height, a resolution, magnifications of portrait/landscape, the number of bits per pixel, and the like when drawing image data for the printer and, subsequently, designates the image data. In case of printing an image, however, only one parameter group is designated, namely, a resolution of the image section is determined at the stage of generating a print command.

Generally, a graphic object such as character, figure, image, or the like to be drawn in a page is transformed to a bit map image at a timing when the print data (print command) is transmitted from the host computer. However, a memory for development of the bit map image as much as one page is necessary in such a case.

Most of the recent printers which can perform a printing process at a high resolution are designed so that the printing process can be performed at the highest resolution even if the printer does not have a memory which can store all of bit map images of one page at the highest resolution at which the printing process can be executed.

As a principle, images are stored in the draw command memory 406 in an intermediate state as draw commands, when the drawer 407 generates bit map images on the basis of the draw commands in the draw command memory 406, the bit map images of one page are not generated in a lump but, in place of it, the bit map images are generated on a unit basis of a band area (hereinafter, referred to as a band) of an almost same size obtained by slicing the page in the main scanning direction. Specifically speaking, at least two memory areas (hereinafter, referred to as band memories) which can store the bit map images of the bands are prepared. The drawer 407 generates a bit map image of the top band into one band memory (referred to as a band memory A) and, subsequently, generates a bit map image of the next band into another band memory (referred to as a band memory B). At a timing when the drawer 407 generates the bit map image in the band memory B, the engine interface 420 transfers the bit map image in the top band generated in the band memory A to the printer engine as a video image, generates a permanent visible image onto the sheet, and generates the bit map image of the next band (second band) into the band memory B for such a period of time. After the output from the band memory A is finished, the third bit map image is generated in the band memory A and the second band image generated in the band memory B is outputted. The above image output is alternately performed after that. That is, the above processes are realized by simultaneously performing in parallel the bit map image generating process and the video sending and printing processes to the printer engine by a multitask technique.

However, when an amount of characters, figures, or images to be drawn in the page is too large, an area size of the draw command memory 406 to store the draw commands as intermediate data transformed from the print commands is insufficient. In such a case, it is abandoned to print at the highest resolution. For example, a memory area which can store the bit map images of one page at the half resolution of the highest resolution is prepared (allocated). The drawer 407 generates the bit map images at the half resolution into such an area on the basis of the draw commands in the draw command memory 406. The draw commands transformed to the bit map images are erased. The subsequent print commands are transformed to the draw commands and stored into the empty memory area. When this area is full, the transformation to the bit map images at the half resolution and the erasure of the draw commands are repeated. When the reception of the print commands of one page is finished and the print commands are transformed to the draw commands and stored in the draw command memory 406, the drawer 407 transforms those draw commands to the bit map images. Subsequently, the engine interface 420 transfers the bit map images of the half resolution to the printer engine as video images and prints them at a low resolution.

In case of performing the resolution reducing process for the image section, in many cases, the picture quality deteriorates because a decimating process is fundamentally performed.

Although there is an example of introducing a technique such that the bit map images or draw commands are redundancy compressed prior to the resolution reducing process and the memory area is falsely widened, the redundancy compression is not universal and it is impossible to avoid the reduction of the resolution in a printer for printing without having a memory area which can store the bit map images of the highest resolution of the page,size to be printed.

Although a method whereby a memory area which can store the bit map images of the highest resolution is provided in the printer so that the reduction of the resolution is unnecessary is also considered, there is a problem of an increase in costs.

On the other hand, a data format such that image data of a plurality of qualities (for example, resolutions) is layered and handled is being spread in recent years. Eastmen Kodak° FlashPix is an example of such a data format which is well known ("FlashPix" is a registered trademark of Eastmen Kodak. A file format of FlashPix and a conventional image format will now be described hereinbelow in comparison.

Description of Conventional Image Format

FIG. 2 shows an example of the conventional image format. As shown in FIG. 2, an image file is divided into a header section and an image data section. Generally, information that is necessary when data is read out from the image file and additional information for explaining the contents of images are stored in the header section. In the example of FIG. 2, information with respect to an image format identifier showing an image format, a file size, a width, a height, and a depth of an image, the presence/absence of compression, information of a color palette; a resolution, an offset to a storing location of the image data, and the like has been stored. The image data section is a section in which the image data has sequentially been stored.

As a typical example of such an image format, Microsoft BMP, and Compuserve GIF are widespread.

Explanation of FlashPix File Format

In a FlashPix file format, which will be explained hereinlater, image attribute,information stored in the image header section and the image data are further layered and stored in the file. The layered image files are shown in FIGS. 8 and 9. Each property and data in the file are accessed by a storage and a stream which correspond to a directory and a file of Microsoft MS-DOS (a "MS-DOS" is a registered trademark of Microsoft).

In FIGS. 8 and 9, a portion with a shadow shows the storage and a portion without a shadow indicates the stream. The image data and the image attribute information are stored in the stream portion. The image data has been layered at different resolutions and the images of the resolutions are called Subimages and shown by Resolution 0, Resolution 1, . . . , and Resolution n. For each resolution image, information necessary to read out the image is stored in a Subimage header and the image data is stored in Subimage data. A Property Set is a set in which the attribute information has been classified and defined in accordance with its use purpose and contents. There are a Summary Info. Property Set, an Image Info. Property Set, an Image Contents Property Set, and an Extension List Property Set.

Explanation of Each Property Set

The Summary Info. Property Set is not peculiar to FlashPix but is a Property Set which is indispensable in a structured storage of Microsoft Corporation and stores a title, an author, a thumbnail image, and the like of the file. The Image Contents Property Set is an attribute describing a storing method of the image data (FIG. 12). In the attributes, the number of layers of the image data, a width and a height of the image of the maximum resolution, a width, a height, and a construction of the color of the image of each resolution, or a definition of a quantization table or a Huffman table when using JPEG compression is described. The Image Info. Property Set stores various information which can be used when the image is used, for example, information indicating how the image is fetched and how it can be used.

Information regarding a method of fetching or generating digital data (File source)

Information regarding a copyright (Intellectual property)

Information regarding contents (a person, a location, or the like in the image) of the image (Content description)

Information regarding a camera used for photographing (Camera information)

Information of the settings (an exposure, a shutter speed, a focal distance, the presence/absence of a flash, and the like) of the camera upon photographing (Per Picture camera settings)

Information regarding a resolution and a mosaic filter which are peculiar to a digital camera (Digital camera characterization)

Information regarding the name of manufacturer, a product name, a kind (negative/positive, color/monochromatic), and the like of a film (Film description)

Information regarding a kind and a size in the case where an original is a book or a printed matter (Original document scan description)

Information regarding a scanner and software used and a person who operated the apparatus in case of a scan image (Scan device)

The Extension List Property Set is an area that is used when information which is not included in the fundamental specification of FlashPix is added.

A FlashPix Image View Object in FIG. 9 is an image file to store both viewing parameter and image data which are used when the image is displayed. The viewing parameter is a set of processing coefficients to store processes for rotation of the image, enlargement/reduction, movement, color conversion, and filtering so as to be adapted when the image is displayed.

A Source/Result FlashPix Image Object is a substance of the FlashPix image data. A Source FlashPix Image Object is indispensable. A Result FlashPix Image Object is an option. The Source FlashPix Image Object stores the original image data. The Result FlashPix Image Object stores the image as a result obtained by performing the image process by using the viewing parameter.

A Source/Result desc. Property Set is a Property Set to identify the image data and stores an image ID, a Property Set for change inhibition, date and time of final updating, and the like.

A Transform Property Set stores Affine transforming coefficients for rotation, enlargement/reduction, and movement, a color conversion matrix, a contrast adjustment value, and filtering coefficients.

Subsequently, handling of the image data will be described.

The image format of FlashPix includes images of a plurality of resolutions divided into tiles. FIG. 10 shows an example of an image file constructed by a plurality of images of different resolutions.

The image of the highest resolution shown in the diagram is constructed by (columns×rows) of (C×R). The image of the second highest resolution is constructed by (C/2×R/2). Subsequently, the number of columns and the number of rows are sequentially reduced by ½ at a time and the reducing process is repeated until both of the columns and rows are equal to 64 pixels or less. As a result of performing the layering process as mentioned above, "the number of layers in one image file" is necessary as attribute information of the image, and the header information described in the term of the conventional image format and the image data are also necessary for the image of each layer. Information regarding the number of layers in one image file, the width and height of the image of the highest resolution, or information regarding the width, height, color construction, compressing method, and the like of the image of each resolution is described in the Image Contents Property Set (FIG. 12).

Further, the image of the layer of each resolution is divided into tiles each comprising (64×64 pixels) as shown in FIG. 11. If the image is sequentially divided into the titles each comprising (64×64 pixels) from the upper left portion of the image, there is a case where a blank occurs in parts of the right edge and lower edge tiles in dependence on the image. In such a case, (64×64 pixels) are constructed by repetitively inserting the rightmost image or bottom image, respectively. In FlashPix, the image in each tile is stored by a method of any of the JPEG compression, single color, and non-compression. The JPEG compression is an image compressing method which was international-standardized by ISO/IECJTC1/SC29. An explanation of the method itself is omitted here.

The image data divided into the titles as mentioned above is stored in the Subimage data stream. All of the total number of tiles, a size of each tile, a start position of the data, and the compressing method are stored in a Subimage header (FIG. 13). The single color is a method of expressing the color of the tile by one color without recording a value of each pixel only in the case where one tile is constructed by the same color as a whole. The above method is particularly useful for an image formed by computer graphics.

As mentioned above, in spite of a fact that the file format which can layer the image data of a plurality of resolutions and handle them is being spread, in the conventional print system, the operation such that data of a format having a plurality of resolutions is effectively handled in accordance with the print purpose or the like and is reflected to the finishing quality of a document to be printed cannot be realized. For example, as mentioned in the description regarding the print purpose setting picture plane, although the "resolution" item which is set by designating the print purpose designates the print resolution of the whole document to be printed, the conventional print system does not have a function such as to designate at which resolution an image should be printed with respect to the image portion that is stored in a file having a data format in which image data of a plurality of resolutions is layered and handled.

Therefore, for example, when the user tries to print and output a document in which an image, characters, and a figure mixedly exist, there is nothing but a method of designating "highest resolution" to the "resolution" item even for a request such that a print quality of the image (gradation image such as a photograph image or the like) section is not specified although the user wants to print the figure at a high quality (high resolution). When the user tries to print such a document, there is a problem that if a figure or the like to be outputted at a high resolution has been drawn in a certain page and an image of a relatively high resolution which consumes remarkably a memory resource is included in the same page, a deterioration of the resolution due to the lack of a memory capacity occurs because of the output at the high resolution of the image which the user of the print system does not desire, and the print quality of the whole page to be printed deteriorates.

When "save toner" is selected as a print purpose in order to suppress the consumption amount of the toner at the time of a test print, the finishing quality of the print obviously deteriorates due to the decimation of the black dots as mentioned above. Therefore, in spite of a fact that the convenience of the print system rises if the print data is printed and outputted in a short time due to such a quality deterioration, the operation such that image data of a quality (resolution) that is further lower than the designated resolution is selected and a size of print data is suppressed to thereby save the time that is required for test print cannot,be realized.

In case of performing a thumbnail print such that images of a plurality of pages are arranged in one page and printed, the images to be printed inherently in one page are reduced and arranged on the page and printed. Therefore, although the images of the page to be reduced can be processed at a resolution lower than the resolution that is inherently designated, the operation such that image data of a quality (resolution) that is further lower than the designated resolution is selected and a size of print data is suppressed to thereby save the time that is required for print cannot be realized.

SUMMARY OF THE INVENTION

The invention is made to solve the problems as mentioned above and it is an object of the invention to provide information processing apparatus and method and a memory medium, in which in the case where an image (gradation image) exists in text data as a print target, a quality of data to be outputted to a printer can be designated as print data corresponding to the image.

Another object of the invention is to provide information processing apparatus and method and a memory medium, in which in the case where images are printed by a plurality of pages onto one recording medium, a thumbnail image to be printed can be designated in accordance with the number of pages.

To solve the above problems, according to the first invention, for example, there is provided an information processing apparatus for outputting print data regarding text data whose print has been instructed to a printer, comprising:

storage holding means for storing and holding a plurality of image data of different resolutions;

designating means for designating a print quality;

selecting means for selecting the image data of the resolution according to the quality designated by the designating means from the storage holding means; and output means for outputting the image data selected by the selecting means to the printer by a predetermined format.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram showing a logic structure of an Image Contents Property Set of the FlashPix image file;

FIG. 13 is a diagram showing a logic structure of a Subimage Header of the FlashPix image file;

FIG. 16 is a diagram of a logic structure of the FPX image in the present invention.

DETAILED DESCRIPTION OF THE PREFERRED EMBODIMENTS

Embodiments according to the invention will now be described in detail hereinbelow with reference to the drawings.

Figure 4:
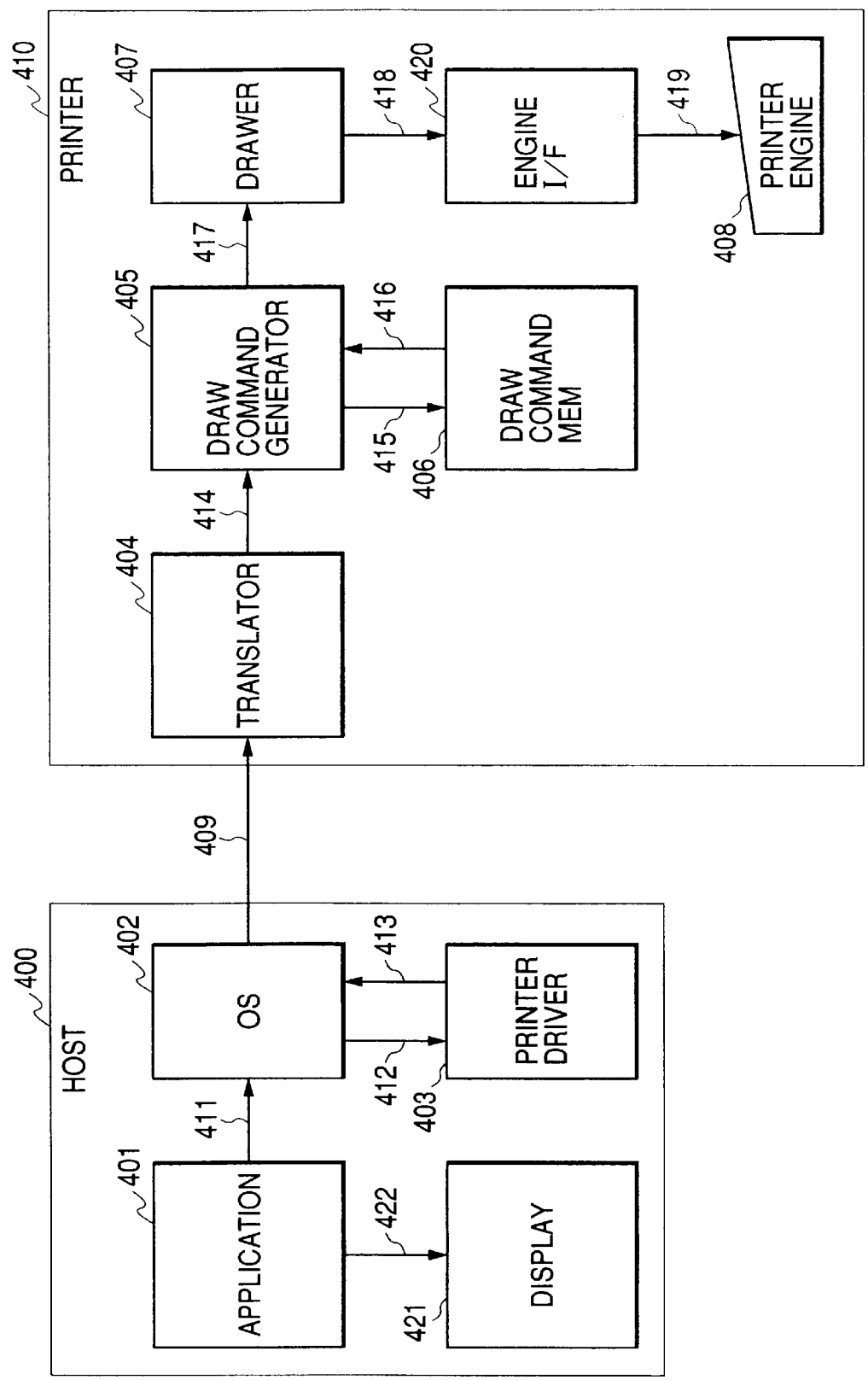
FIG. 4 is a block constructional diagram of the print system.

Since a print system, which will be explained in the embodiments, can be realized by a block construction similar to that of the conventional print system described in conjunction with FIG. 4, it will be explained hereinbelow with reference to FIG. 4.

In the following embodiments, it is assumed that an image according to a data format in which image data of a plurality of qualities is layered and handled is called an FPX image and a quality denotes a resolution.

FIG. 16 shows a diagram of a logic structure of the FPX image in the embodiment. In the diagram, reference numeral 1601 denotes a whole FPX image; 1602 indicates an area where the number of subimages included in the whole FPX image 1601 has been stored; 1603 an area where a resolution of the subimage 1 included in the FPX image 1601 has been stored; 1604 an area where a resolution of the subimage 2 included in the FPX image 1601 has been stored; and 1605 an area where a resolution of the subimage n included in the FPX image 1601 has been stored. The above information relates to the whole FPX image 1601.

Reference numeral 1611 denotes an area where a width and a height of the subimage 1 included in the FPX image 1601 has been stored; 1612 an area where the number of bits per pixel of the subimage 1 included in the FPX image 1601 have been stored; 1613 an area where a data size of the subimage 11 included in the FPX image 1601 has been stored; and 1614 an area where data of the subimage 1 included in the FPX image 1601 has been stored. The above information relates to the subimage 1.

Reference numeral 1621 denotes an area where a width and a height of the subimage 2 included in the FPX image 1601 have been stored; 1622 an area where the number of bits per pixel of the subimage 2 included in the FPX image 1601 has been stored; 1623 an area where a data size of the subimage 2 included in the FPX image 1601 has been stored; and 1624 an area where data of the subimage 2 included in the FPX image 1601 has been stored. The above information relates to the subimage 2.

Reference numeral 1631 denotes an area where a width and a height of the subimage n included in the FPX image 1601 have been stored; 1632 an area where the number of bits per pixel of the subimage n included in the FPX image 1601 has been stored; 1633 an area where a data size of the subimage n included in the FPX image 1601 has been stored; and 1634 an area where data of the subimage n included in the FPX image 1601 has been stored. The above information relates to the subimage n.

In FIG. 16, the logic structure of the FPX image including n subimages has been described. In the embodiment, an FPX image including three subimages will be described as an example hereinbelow. In this instance, 3 is substituted for n as the number of subimages in the example of FIG. 16 and an explanation will be made.

In the embodiment, the resolution of the subimage 1 is set to 300 dpi, the resolution of the subimage 2 is set to 150 dpi as a resolution of ½ of the subimage 1, and the resolution of the subimage 3 is set to 75 dpi as a resolution of ¼ of the subimage 1.

For simplicity of explanation, there are three kinds of print purposes of "text/table", "quick text", and "save toner" which can be Selected in the embodiment and their print resolutions are set to "fine", "quick", and "quick", respectively. Specifically speaking, it is assumed that "fine" and "quick" of the resolutions are equal to print resolutions (resolution of the printer) of 600 dpi and 300 dpi, respectively. Qualities of the FPX image in the print purposes are set to "MAX", "½ MAX", and "¼ MAX", respectively.

A text to be printed is formed by, for example, text processing software (so called word processor software) and a text in which characters and an image mixedly exist in one page will be described as an example. It will be obviously understood that the text to be printed is not limited.

First, processes for deciding a print resolution and a quality of the FPX image in accordance with a print purpose will now be described with reference to a flowchart of FIG. 3. First, although the print purpose is inputted by the user of the print system, it is assumed that it is inputted by using an input device (not shown) such as mouse, keyboard, or the like of the host computer 400. When the print purpose is inputted, whether the print purpose is "text/table" or not is discriminated (step S301). If it is "text/table", the print resolution is designated to "fine" (S302). Subsequently, the resolution of the FPX image is designated to "MAX" (S303).

If the print purpose is not "text/table" in step S301, step S304 follows and whether the print purpose is "quick text" or not is checked. If it is "quick text", the print resolution is designated to "quick" (step S305). Subsequently, the resolution of FPX image is equal to "½ MAX" (S306).

The resolution of the FPX image here indicates the resolution of the FPX image to be printed and differs from a recording resolution of the printer. As for the information other than the images existing in one page, for example, characters or the like, the printer merely generates and prints a pattern corresponding to the recording resolution of itself by designating its size (point number) and font.

If the print purpose is not "quick text" in step S304, it is regarded to be "save toner" and the print resolution is designated to "quick" (S307). Subsequently, the resolution, of the FPX image is designated to "¼ MAX" (S308). The quality of the FPX image can be specified every print purpose by the above processes.

Figure 5B:
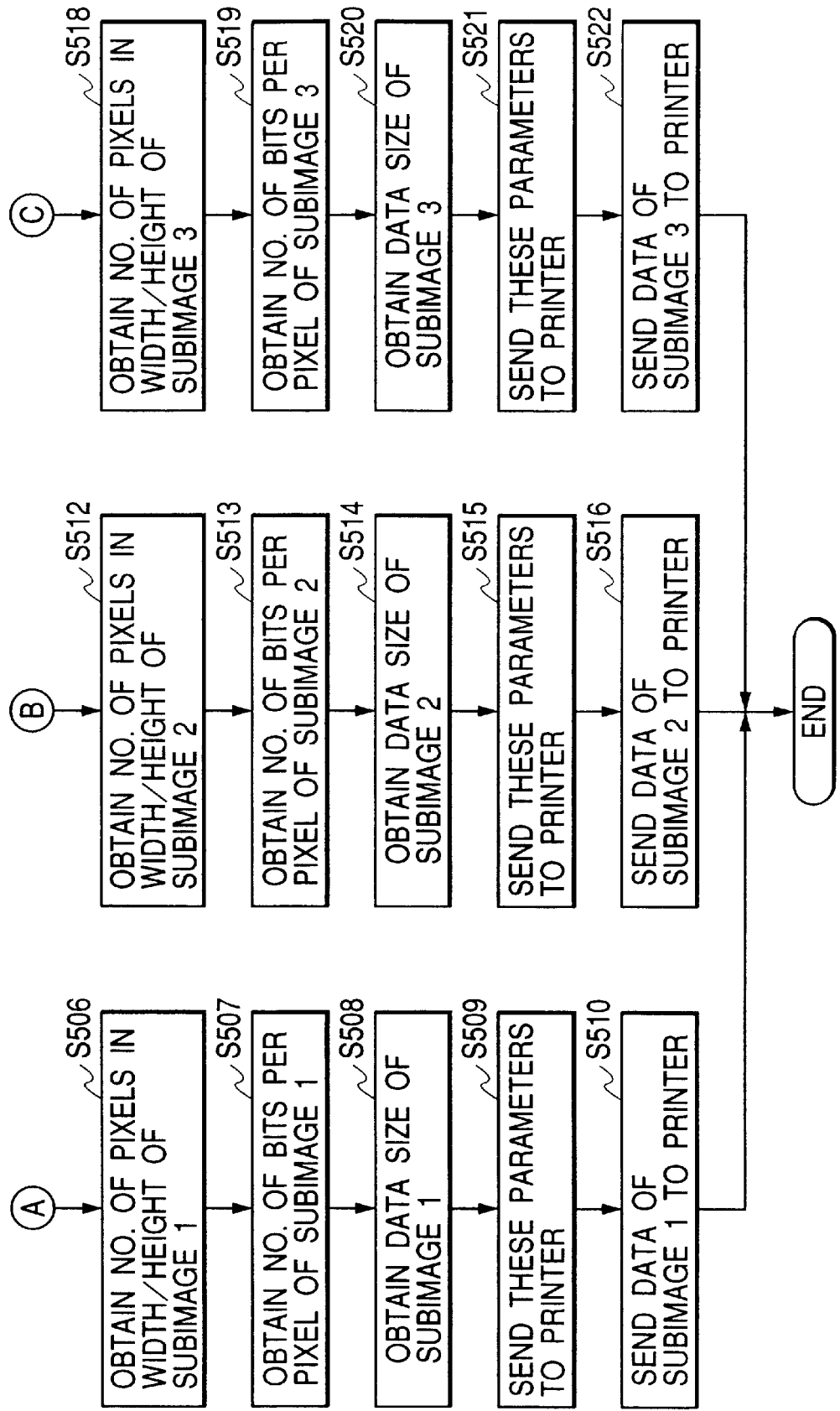
FIG. 5 which is comprised of FIGS. 5A and 5B are showing flowcharts for a process to generate a print command of an FPX image section by a host computer of a print system of the first embodiment.
Figure 6:
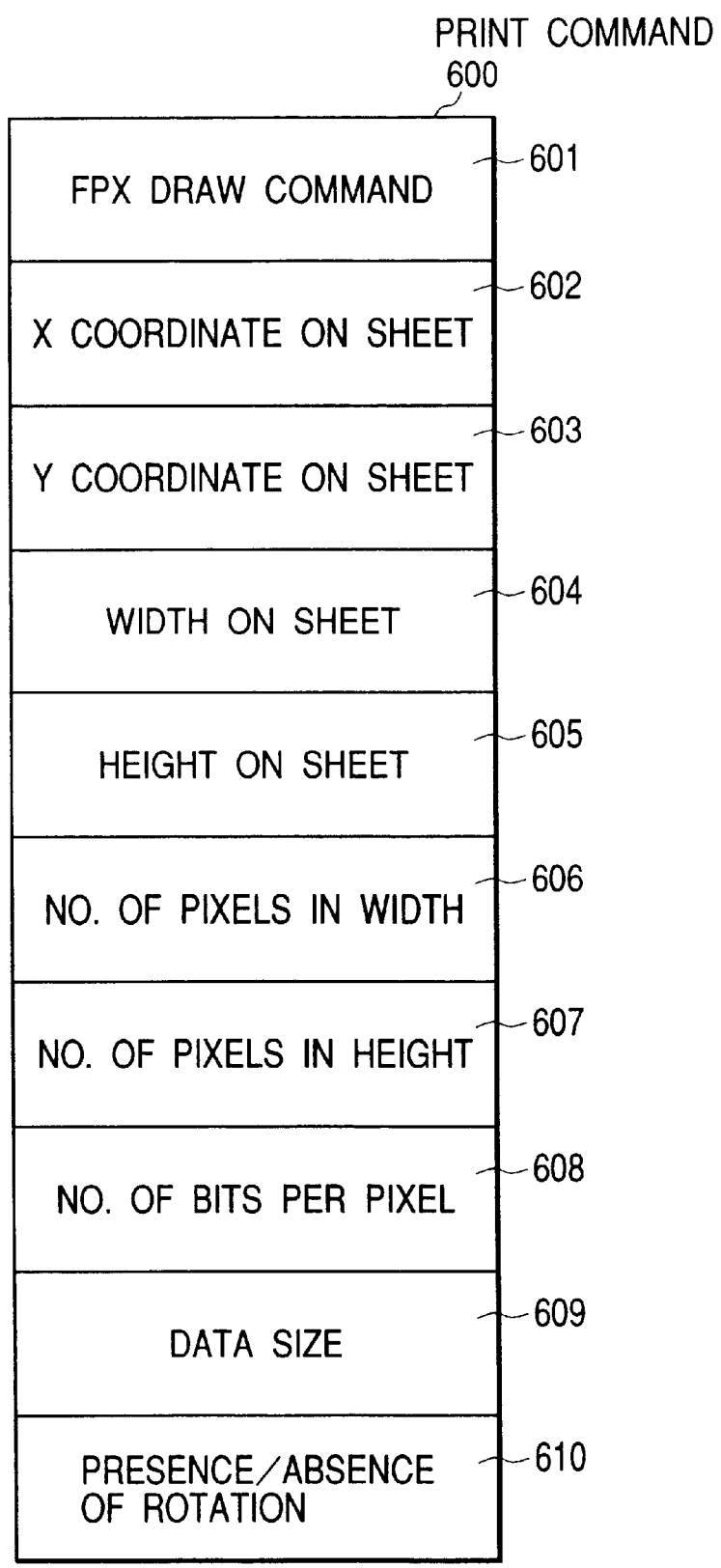
FIG. 6 is a diagram showing a logic structure of a print command to draw an FPX image which is generated by the host computer of the print system in each of the first and second embodiments.

Subsequently, a process for generating a print command of the FPX image section on the host computer 400 side in accordance with a result of discrimination about to which one of "text/table", "quick text", and "save toner" the print purpose has been set will be described with reference to FIGS. 5A and 5B showing a flowchart and FIG. 6 showing a logic structure diagram of the print command. It is assumed that as for the FPX image to be drawn in the embodiment, the subimages of 300 dpi, 150 dpi, and 75 dpi have been layered and stored in, for example, a hard disk device.

The logic structure of the print command will be first described. FIG. 6 shows an example of the logic structure of the print command. In the diagram, reference numeral 600 denotes a print command in an image in a print job. The print command 600 is divided into a plurality of fields. Reference numeral 601 denotes a field where information to identify that the print command is "FPX draw command" is stored; 602 a field where an X coordinate value of the position when the FPX image to be drawn is drawn on the sheet is stored; 603 a field where a Y coordinate value of the position when the FPX image to be drawn is drawn on the sheet is stored; 604 a field where a size value in the width direction when the FPX image to be drawn is drawn on the sheet is stored; 605 a field where a size value in the height direction when the FPX image to be drawn is drawn on the sheet is stored; 606 a field where the number of pixels in the width direction of the FPX image is stored; 607 a field where the number of pixels in the height direction of the FPX image is stored; 608 a field where the number of bits per pixel of the FPX image is stored; 609 a field where a data size of the FPX image is stored; and 610 afield where information to instruct whether the image is rotated or not, which will be explained in the second embodiment, is stored.

The X and Y coordinates, width, and height which are stored in the fields 602 to 605 are the X and Y coordinates, width, and height of the area where the drawn image occupies on the sheet and are different from the numbers of pixels in the width and height directions which the FPX image has and are stored in the fields 606 and 607. Each of the above fields is temporarily held in an RAM (not shown) which the host computer 400 has until the data is constructed and is outputted to the printer after waiting until they are constructed. Therefore, each field in a processing procedure in FIGS. 5A and 5B, which will be explained hereinlater, will be described on the assumption that it denotes the area held in the RAM.

In the case where a print request is issued from the user, when a document as a print target is outputted, if an image having a plurality of layers, for example, an FPX image exists in the document, the application program 401 inputs a file name of the FPX image, coordinates of the drawing position on the sheet, and the width and height on the sheet, and outputs the information regarding the FPX image as a drawing function (GDI function) to the operating system 402 in a manner similar to the other draw data (characters, figure, etc.) in the document (step S501). The operating system 402 transforms all of the information inputted in step S501 to a DDI function and sends them to the printer driver 403 (step S502).

The printer driver 403 stores the transmitted information about the drawing position coordinates and the width and height on the sheet into the fields 602, 603, 604, and 605 of the print command in accordance with the logic structure described in FIG. 6 (step S503).

Subsequently, the printer driver 403 specifies a storing location of the FPX file on the basis of the file name of the FPX image sent from the operating system 402 in step S502, opens the FPX file, and examines the number of subimages in the FPX file and the resolution of each subimage (step S530). The printer driver 403 can identify that the file is a file in which the FPX image has been stored on the basis of the file name of the FPX image sent from the operating system 402 from, for example, an extension of the file.

The printer driver 403 obtains the relevant FPX file by searching storage means (not shown) such as a hard disk or the like in the host computer 400. In the case where the relevant FPX file cannot be specified here, the printer driver 403 generates the print command by using the FPX image obtained from the application as it is without executing processes in subsequent steps S504 to S522. It is assumed that the printer driver 403 can process the data in the file in accordance with the logic structure of the FPX image file as shown in FIG. 16.

The printer driver 403 reads out the number of subimages from the area 1602 where the number of subimages included in the whole FPX image 1601 shown in FIG. 16 has been stored and subsequently sequentially reads the resolutions of the subsequent subimages as many as the number of subimages. In the embodiment, the resolution of each subimage is read out from the area 1603 where the resolution of the subimage 1 has been stored, the area 1604 where the resolution of the subimage 2 has been stored, and the area 1605 where the resolution of the subimage n has been stored. In the following explanation, n is 3.

Subsequently, the printer driver 403 examines the print purpose set by the user prior to the start of the print instruction (step S504). If the print purpose is "text/table", the printer driver 403 selects the subimage of the highest resolution of the FPX image as a processing target as set in step S303 in FIG. 3. In the embodiment, however, the subimage 1 of 300 dpi is selected on the basis of the resolution information of each subimage examined in step S530 (step S505).

Subsequently, the printer driver 403 reads out the numbers of pixels of the width and height of the subimage 1 of 300 dpi of the FPX image to be drawn and stores them in the fields 606 and 607 in accordance with the logic structure described in FIG. 6 (step S506). For this process, it is sufficient to read out desired information from the area 1611 where the width and height of the subimage 1 have been stored while sequentially processing the information in accordance with the logic structure of the FPX image in FIG. 16.

The printer driver 403 obtains the number of bits per pixel of the subimage 1 of 300 dpi of the FPX image to be drawn and stores it into the field 608 in accordance with the logic structure described in FIG. 6 (step S507). For this process, it is sufficient to read out desired information from the area 1612 where the number of bits per pixel of the subimage 1 has been stored while sequentially processing the information in accordance with the logic structure of the FPX image in FIG. 16.

The printer driver 403 obtains the size of whole subimage 1 of 300 dpi of the FPX image to be drawn and stores it into the field 609 in accordance with the logic structure described in FIG. 6 (step S508). For this process, it is sufficient to read out desired information from the area 1613 where the data size of the subimage 1 has been stored while sequentially processing the information in accordance with the logic structure of the FPX image in FIG. 16.

The above parameters are sent to the printer 410 via the operating system 402 together with the kind of print command (in this case, "FPX draw command" stored in the field 601) (step S509). Subsequently, the printer driver reads out the data of the subimage 1 of 300 dpi from the FPX image file and sends it to the printer 410 via the operating system 402 (step S510). For this process, it is sufficient to read out desired information from the area 1614 where the data of the subimage 1 has been stored while sequentially processing the information in accordance with the logic structure of the FPX image in FIG. 16.

Figure 1:
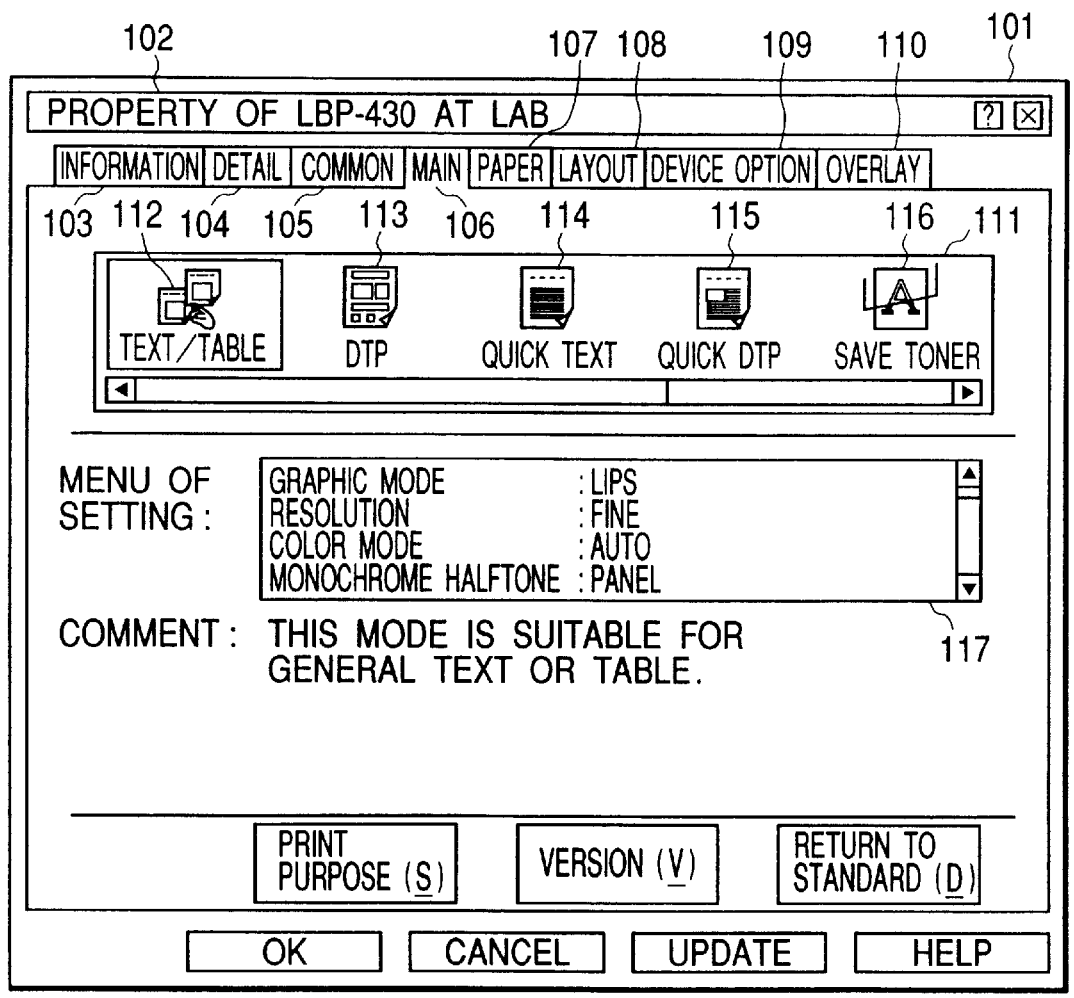
FIG. 1 is a diagram showing an example of a picture plane display of a print system which is used to designate a print quality.
Figure 2:
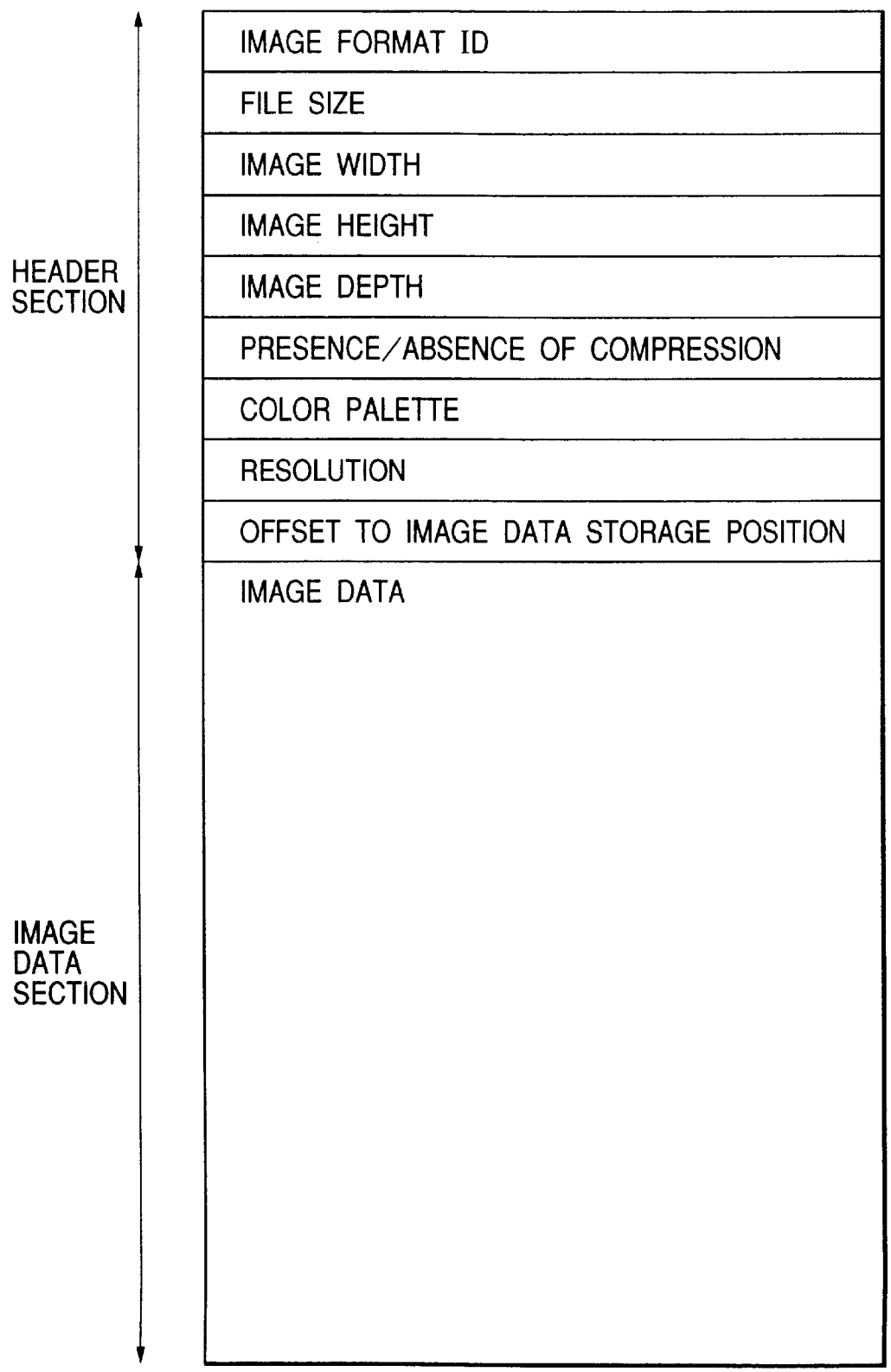
FIG. 2 is a diagram showing an example of a format of image data.
Figure 3:
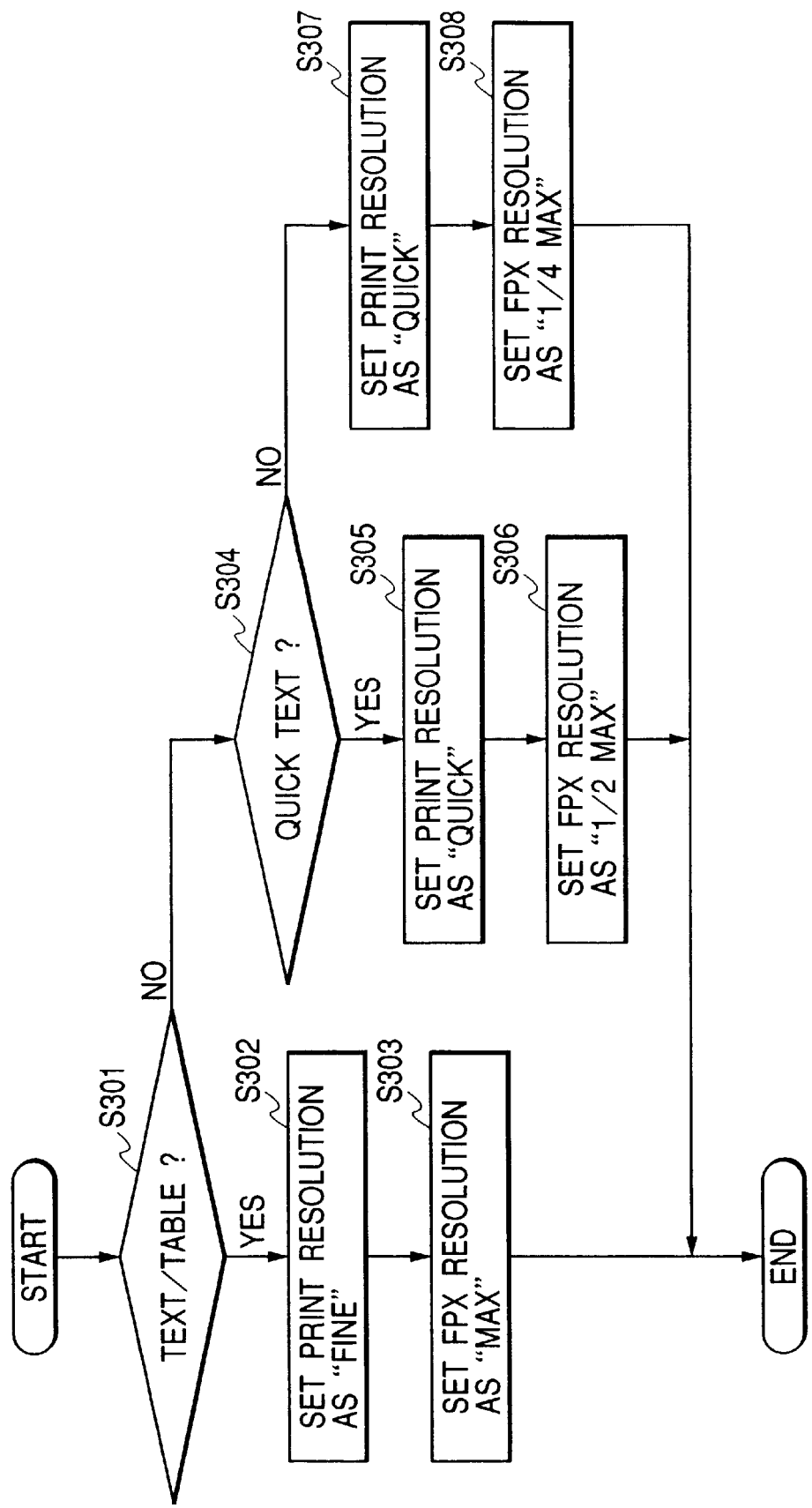
FIG. 3 is a flowchart for a process to designate a print resolution and a quality of an FPX image in accordance with a print purpose.

In step S504, if the set print purpose is "quick text", the subimage of the resolution of "½ MAX" of the FPX image is selected as a processing target as set in step S306 in FIG. 3. In the embodiment, the subimage 2 of 150 dpi is selected on the basis of the resolution information of each subimage examined in step S530 (step S511).

The printer driver 403 reads out the numbers of pixels of the width and height of the subimage 2 of 150 dpi of the FPX image to be drawn from the FPX file and stores them into the fields 606 and 607 in accordance with the logic structure described in FIG. 6 (step S512). For this process, it is sufficient to read out desired information from the area 1621 where the width and height of the subimage 2 have been stored while sequentially processing the information in accordance with the logic structure of the FPX image in FIG. 16.

The printer driver 403 obtains the number of bits per pixel of the subimage 2 of 150 dpi of the FPX image to be drawn and stores it into the field 608 in accordance with the logic structure described in FIG. 6 (step S513). For this process, it is sufficient to read out desired information from the area 1622 where the number of bits per pixel of the subimage 2 has been stored while sequentially processing the information in accordance with the logic structure of the FPX image in FIG. 16.

The printer driver 403 obtains the size of whole subimage 2 of 150 dpi of the FPX image to be drawn and stores it into the field 609 in accordance with the logic structure described in FIG. 6 (step S514). For this process, it is sufficient to read out desired information from the area 1623 where the data size of the subimage 2 has been stored while sequentially processing the information in accordance with the logic structure of the FPX image in FIG. 16.

The above parameters are sent to the printer 410 via the operating system 402 together with the kind of print command (in this case, "FPX draw command" stored in the field 601) (step S515). Subsequently, the printer driver reads out the data of the subimage 2 of 150 dpi from the FPX image file and sends it to the printer 410 via the operating system 402 (step S516). For this process, it is sufficient to read out desired information from the area 1624 where the data of the subimage 2 has been stored while sequentially processing the information in accordance with the logic structure of the FPX image in FIG. 16.

In step S504, if the set print purpose is "save toner", the subimage of the resolution of "¼ MAX" of the FPX image is selected as a processing target as set in step S308 in FIG. 3. In the embodiment, the subimage 3 of 75 dpi is selected on the basis of the resolution information of each subimage examined in step S530 (step S517).

The printer driver 403 reads out the numbers of pixels of the width and height of the subimage 3 of 75 dpi of the FPX image to be drawn from the FPX file and stores them into the fields 606 and 607 in accordance with the logic structure described in FIG. 6 (step S518). For this process, it is sufficient to read out desired information from the area 1631 where the width and height of the subimage 3 have been stored while sequentially processing the information in accordance with the logic structure of the FPX image in FIG. 16.

The printer driver 403 obtains the number of bits per pixel of the subimage 3 of 75 dpi of the FPX image to be drawn and stores it into the field 608 in accordance with the logic structure described in FIG. 6 (step S519). For this process, it is sufficient to read out desired information from the area 1632 where the number of bits per pixel of the subimage 3 has been stored while sequentially processing the information in accordance with the logic structure of the FPX image in FIG. 16.

The printer driver 403 obtains the size of whole subimage 3 of 75 dpi of the FPX image to be drawn and stores it into the field 609 in accordance with the logic structure described in FIG. 6 (step S520). For this process, it is sufficient to read out desired information from the area 1633 where the data size of the subimage 3 has been stored while sequentially processing the information in accordance with the logic structure of the FPX image in FIG. 16.

The above parameters are sent to the printer 410 via the operating system 402 together with the kind of print command (in this case, "FPX draw command" stored in the field 601) (step S521). Subsequently, the printer driver reads out the data of the subimage 3 of 75 dpi from the FPX image file and sends it to the printer 410 via the operating system 402 (step S522). For this process, it is sufficient to read out desired information from the area 1634 where the data of the subimage 3 has been stored while sequentially processing the information in accordance with the logic structure of the FPX image in FIG. 16.

Therefore, the print command in which the resolution regarding the image section in the document has been changed independent of the print resolution can be generated in accordance with the print purpose.

Figure 7:
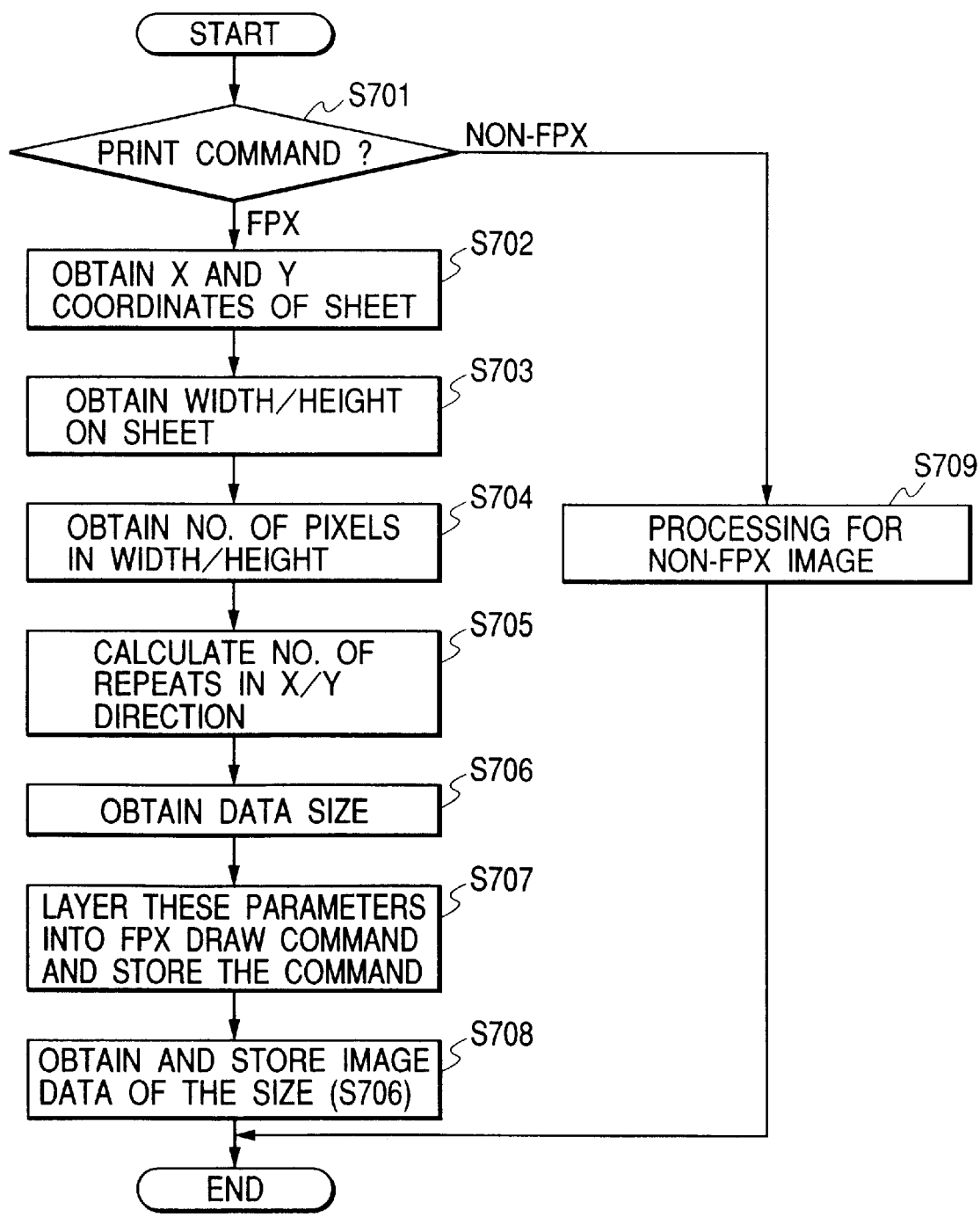
FIG. 7 is a flowchart for a process to generate an FPX draw command.
Figure 8:
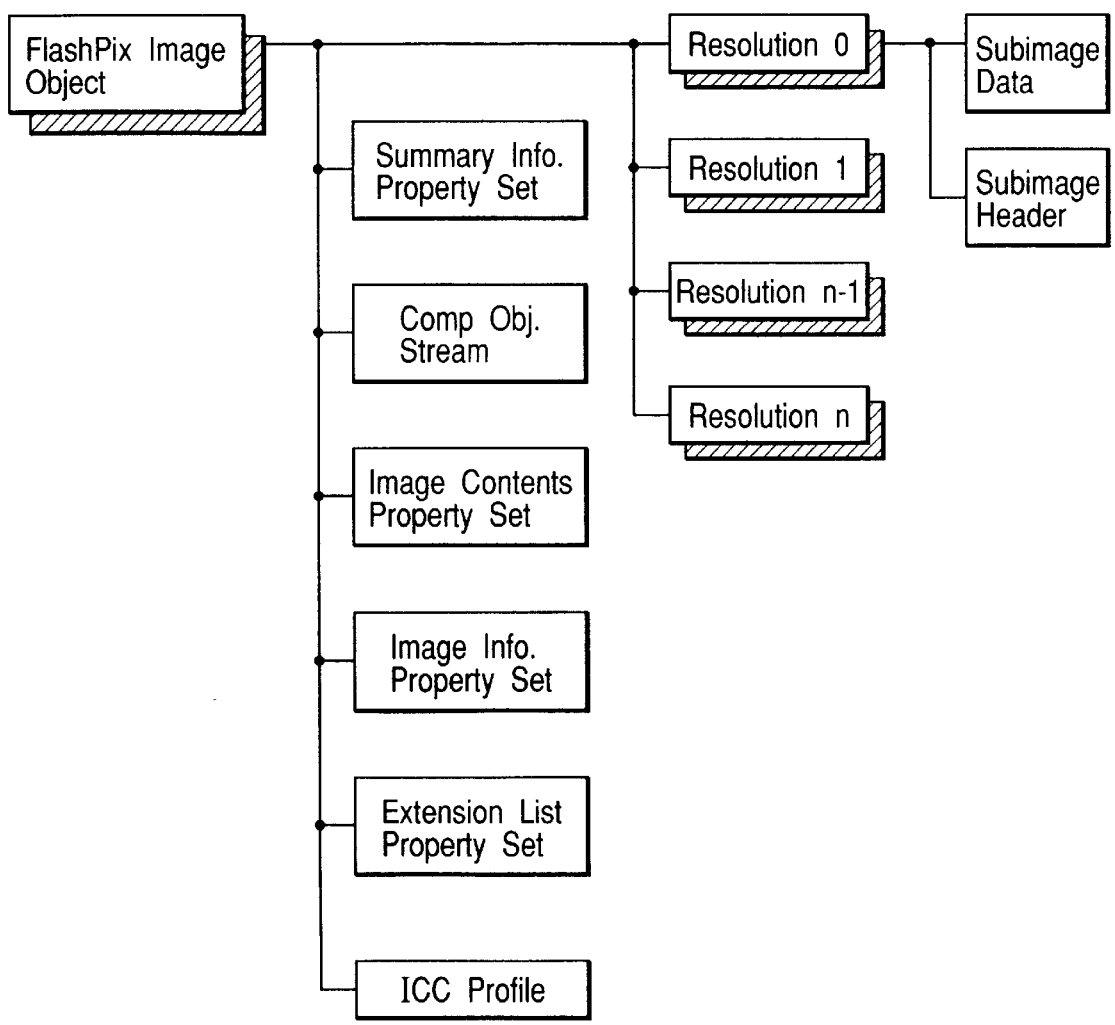
FIG. 8 is a diagram showing a logic structure of a FlashPix image file.
Figure 9:
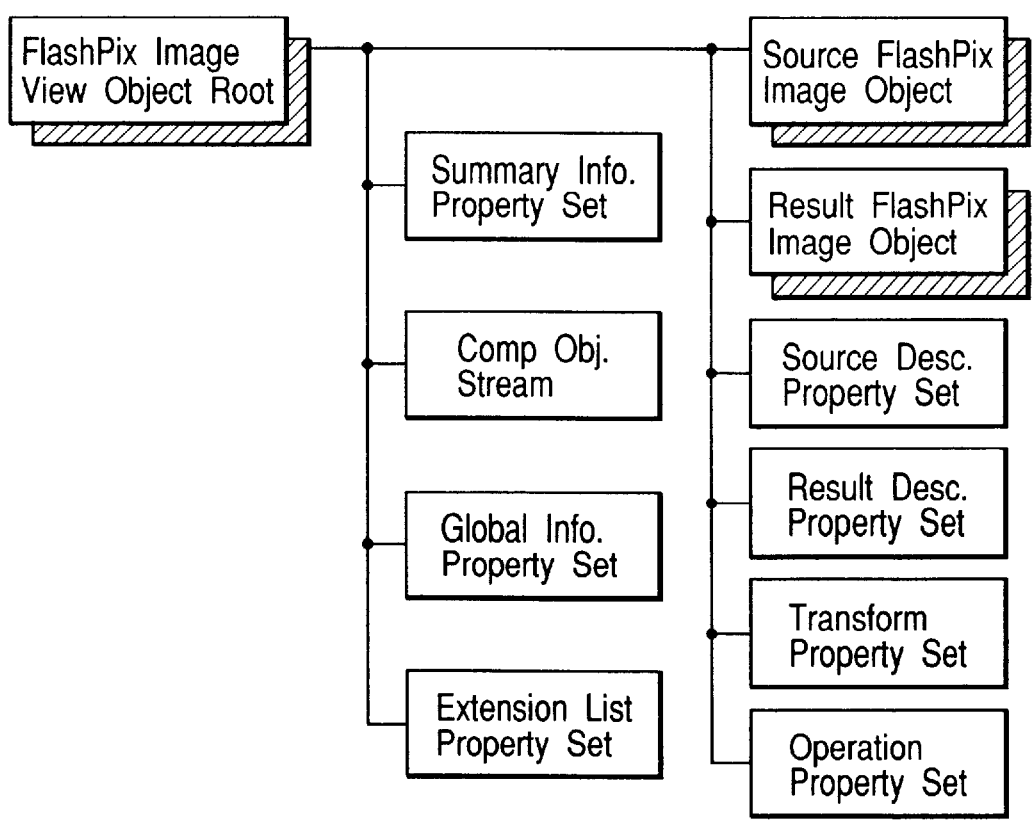
FIG. 9 is a diagram showing a logic structure of a FlashPix image file.
Figure 10:
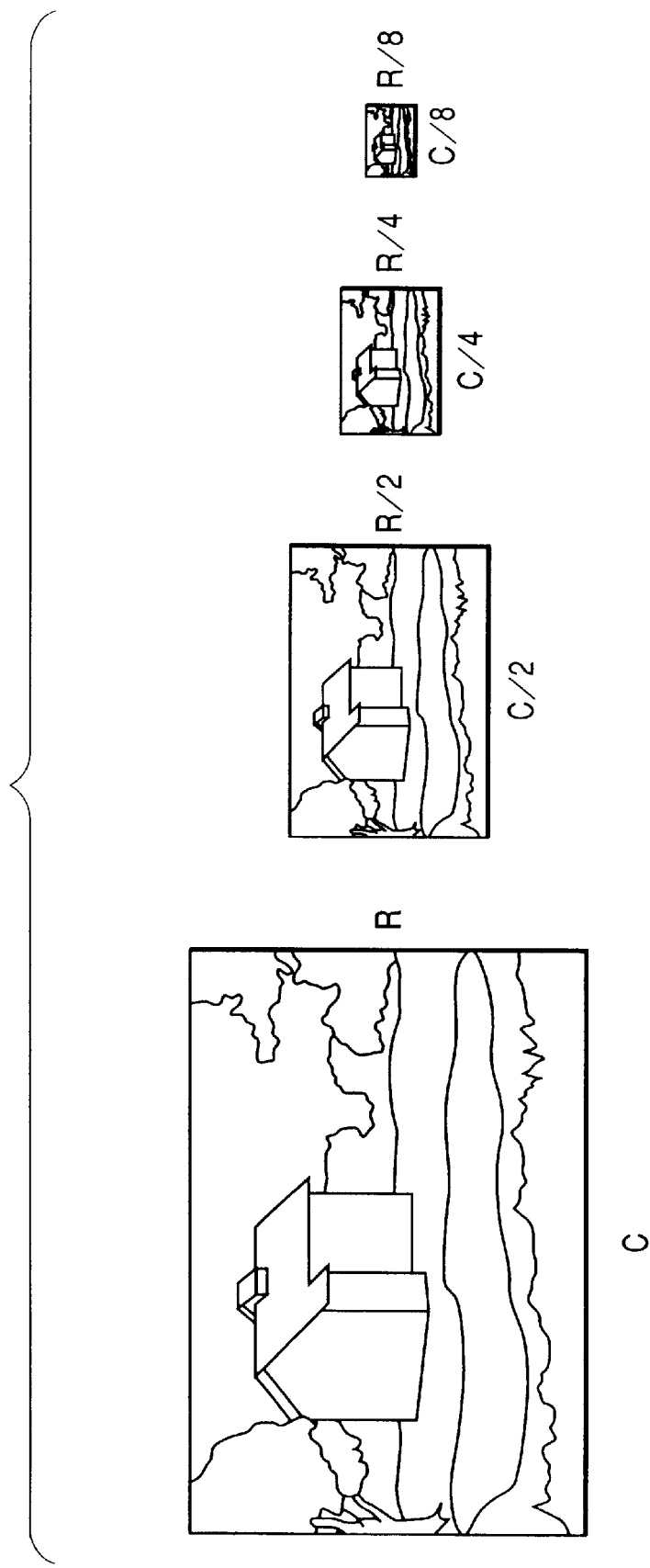
FIG. 10 is a diagram showing an example of a plurality of images of different resolutions constructing the FlashPix image file.
Figure 11:
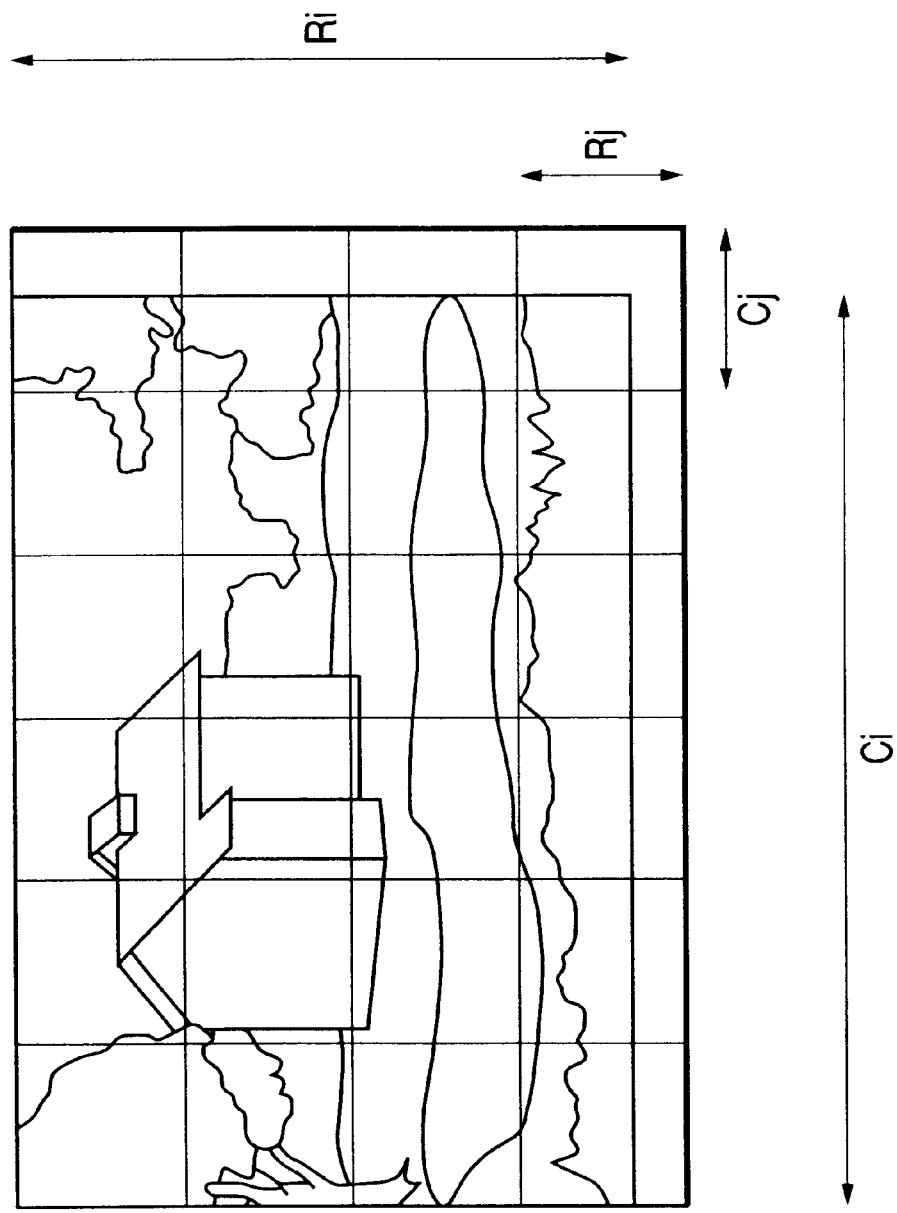
FIG. 11 is a diagram for explaining a state of a tile division of a subimage of the FlashPix image file.

Subsequently, processes for receiving the print command on the printer 410 side, transforming it to the draw command, and storing it into the draw command memory 406 will be described with reference to a flowchart of FIG. 7.

When the printer 410 receives the print command sent through the communication path 409, the translator 404 examines the kind of print command (step S701).

When there is an image draw command in the print command, whether the image whose drawing is designated by the image draw command is an image which can have a plurality of layers or not is discriminated. When the image draw command indicates the image which can have a plurality of layers, for example, if the image draw command is the FPX draw command, the information and the X and Y coordinates of the drawing position on the sheet are obtained and sent to the draw command generator 405 (step S702). It is now assumed, however, that the FPX draw command (FPX: image drawing processing command) to be processed at this time conforms with the logic structure described in FIG. 6 and the data of each field can be also read out on the printer 410 side in accordance with the logic structure.

Subsequently, the translator 404 obtains the width and height on the sheet and sends them to the draw command generator 405 (step S703). The translator 404 obtains the numbers of pixels of the width and height of the subimage and sends them to the draw command generator 405 (step S704). Subsequently, the translator 404 calculates the numbers of repeats in the X and Y directions and sends them to the draw command generator 405 (step S705). That is, the number of repeats denotes the number of repeating times of the drawing operation to draw each pixel of the image to be drawn in each of the X and Y directions. If the image data indicates a binary image and the printer to draw and output it is also a binary printer (generally, monochromatic printer), it is sufficient to obtain the numbers of repeats by the following equations.

The number of repeats in the X direction=(the width of image on the sheet×(the resolution of the printer)/(the number of pixels of the width of the subimage)

The number of repeats in the Y direction=(the height of image on the sheet)×(the resolution of the printer)/(the number of pixels of the height of the subimage)

In the case where the input data is multivalue data and the printer is the binary printer, it is obviously necessary to take into consideration of size information of a micro area for a (multivalue→binary) converting process. It is assumed that the number of repeats to be obtained here is simply determined as the number of repeating times of the output of the pixel in consideration of the input data as mentioned above and the characteristics of the printer.

Subsequently, the translator 404 obtains the size of image data and sends it to the draw command generator 405 (step S706). The draw command generator 405 layers each parameter obtained or calculated in steps S702, S703, S704, S705, and S706 as an FPX draw command and stores it into the draw command memory 406 (step S707).

The draw command generator reads the image data of only the size obtained in step S706 via the translator 404 and stores it in association with the parameter information of the draw command already stored in the draw command memory (step S708).

On the other hand, when the print command is not the FPX draw command in step S701, for example, if it is a draw command of characters or figure or an image draw command to draw an image which cannot have a plurality of layers, the process corresponding to the command is executed (step S709).

Figure 14:
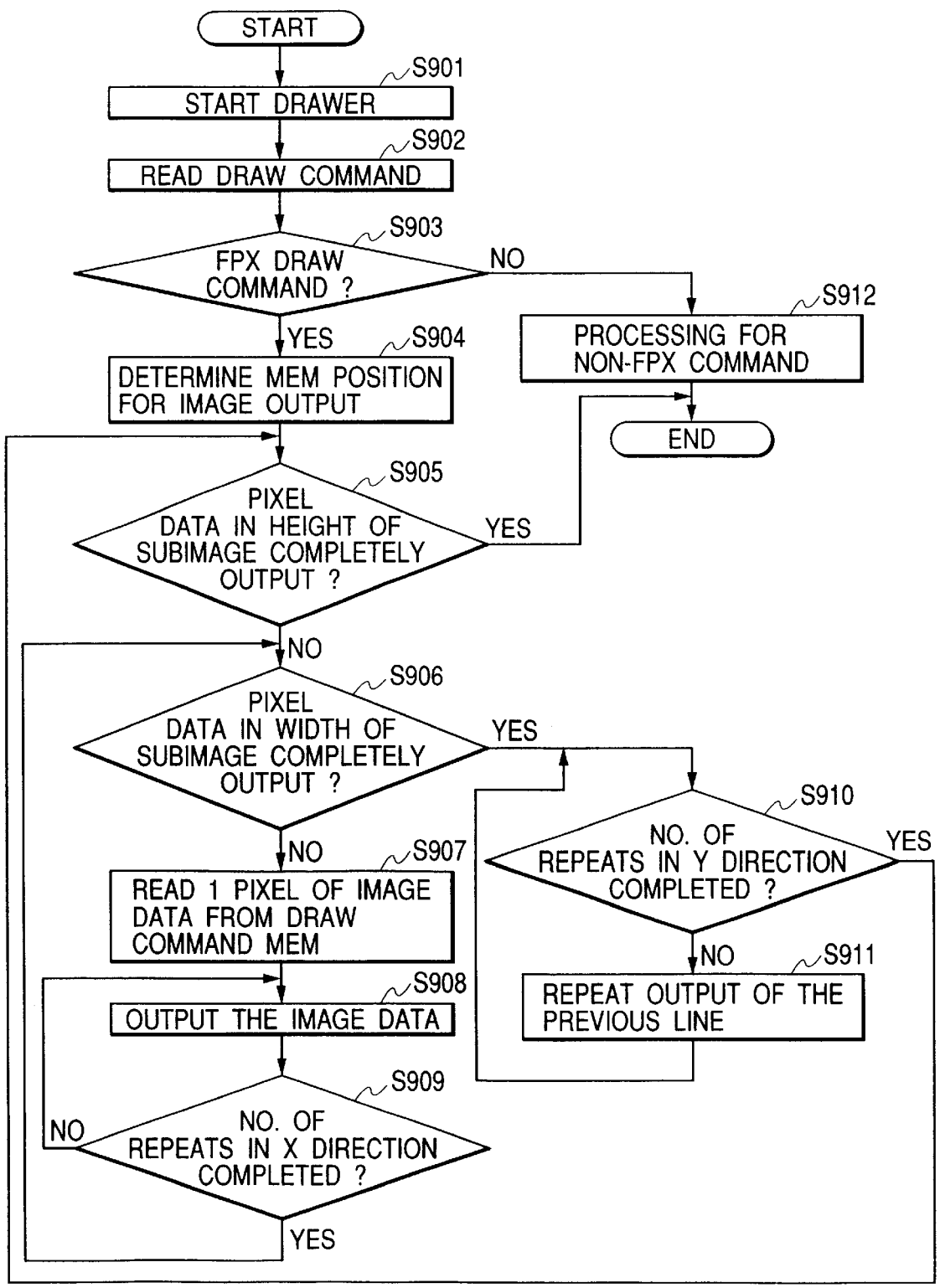
FIG. 14 is a flowchart showing contents of an FPX draw command executing process.

A process such that the drawer 407 reads the draw command from the draw command memory and draws an image will now be described with reference to a flowchart of FIG. 14. This flowchart shows a process for discriminating the command to draw the FPX image and drawing the FPX image.

This process is started fundamentally when the print commands of one page are converted to the draw commands of the intermediate data format and stored in the draw command memory and the print command indicative of "page end" is received. However, there is also a case where even when an amount of characters, figures, and images to be drawn in the page is too large and all of the draw commands cannot be simultaneously stored in the draw command memory, a memory area of one page (there is a case where a redundancy compressing process or a resolution reducing process is accompanied) is allocated and the process is executed before the "page end" print command is received.

When the printer 410 receives the "page end" print command or the like and the drawer 407 is activated (step S901), the drawer 407 reads the draw command and the associated parameter from the draw command memory 406 (step S902).

If the draw command is not the FPX draw command (step S903), another process is executed (step S912). If it is the FPX draw command in step S903, the position on the memory to output the bit map image is determined from the drawing position coordinates on the sheet of the parameter read out from the draw command memory (step S904). Subsequently, a counter is set so as to output the pixel data in the height of the subimage to be outputted (step S905). The counter is set so as to output the pixel data in the width of the subimage to be outputted (step S906). It is assumed that the counter to count the number of pixels in the width direction is properly initialized each time the line to be outputted is updated.

Subsequently, the image data of one pixel is read out from the draw command memory 406 (step S907) and outputted (step S908). At the time of this outputting process, a process for converting the multivalue data to the binary data or the like is also executed as necessary. An output destination drawing position is updated to output next pixel data. Subsequently, the output of the same pixel data is repeated by the number of repeats in the X direction obtained in step S705 in the flowchart of FIG. 7 (step S909). When the output is finished, the processing routine advances to step S906 in order to process the next pixel data.

If the outputting process of the pixel data of the width of the subimage is not finished in step S906, the processes in steps S906, S907, S908, and S909 are repeated. If the outputting process was finished, the output result of the previous line is repeated by the number of repeats in the Y direction obtained in step S705 in the flowchart of FIG. 7 (steps S910, S911). Subsequently, step S905 follows in order to process the next line of the FPX image. Each of the processing steps described above is repeated until the processes are finished in the whole height of the FPX image.

Consequently, even in any source image, the sizes of the images recorded on the recording paper (recording medium) can be equalized. Although it is assumed that the FPX image in the embodiment has the layer images of 300 dpi, 150 dpi, and 75 dpi, obviously, it can also have the other layer images. There is no relation between the resolution of the image data and the recording resolution of the engine section of the printer. That is, the FPX image in the case where sentences of characters or the like and the FPX image described in the embodiment mixedly exist in one page has been described. A pattern (in case of a character, a character pattern including its size) which is generated by a command to draw a character code, a line, or the like other than the image is generated in dependence on the recording resolution of the printer engine. As for the print purpose of "save toner", it is sufficient to print by calculating the AND with the pattern drawn by a zigzag mask pattern, calculating the AND with a pattern of the inside of the edge, or the like, or a bias voltage of the photosensitive drum can be changed. Since the toner saving mode is not directly concerned with the present invention, its description is omitted.

Second Embodiment

A drawing process of the FPX image which is executed when a thumbnail print is designated will now be described as a second embodiment of the invention.

Since a print system, which will be explained in the embodiment, can be also realized by a block construction similar to hardware (software regarding its process is obviously different) similar to that of the conventional print system described in FIG. 4, it will be described hereinbelow with reference to FIG. 4.

Even in the second embodiment, an image which conforms with the data format in which image data of a plurality of qualities is layered and handled is called an FPX image and it is assumed that the quality denotes the resolution. It is also assumed that the FPX image has the same logic structure as that described in conjunction with FIG. 16 in the first embodiment and its logic structure will be described also with reference to FIG. 16 in the second embodiment.

Although the logic structure of the FPX image including n subimages has been described in FIG. 16, the FPX image including three subimages will be described as an example hereinbelow in the second embodiment. In this instance, explanation will be made while substituting n for n as the number of subimages in the example of FIG. 16.

In the second embodiment as well, the resolution of the subimage 1 is set to 300 dpi, the resolution of the subimage 2 is set to 150 dpi corresponding to ½ of the subimage 1, and the resolution of the subimage n is set to 75 dpi corresponding to ¼ of the subimage 1, respectively.

In the second embodiment, it is assumed that when the thumbnail print is designated by using the input device (not shown) such as keyboard, mouse, or the like of the host computer 400, in accordance with a designated page layout, the printer driver 403 executes a reducing process, a rotating process, or an arranging process of pages which are arranged in one sheet as necessary. For example, when a page layout such that two pages are printed in one recording paper is designated, the printer driver 403 executes the rotation of each page, the movement of coordinates, and the reducing process, generates a print command, and sends it to the printer 410 via the operating system 402 and communication path 409.

In the second embodiment as well, it is assumed that the print command according to the logic structure described in FIG. 6 is used. In the second embodiment, it is also assumed that the print resolution is set to "fine", namely, 600 dpi and, when the thumbnail print is not designated, the FPX image is printed at a resolution of 300 dpi, and when the thumbnail print is designated, if the number of pages which are printed in one sheet is equal to 2 or 4 in accordance with its layout situation, the quality of the FPX image is set to 150 dpi, and when the number of pages which are printed in one sheet is equal to 8, the quality of the FPX image is reduced to 75 dpi. Explanation regarding the processes when the thumbnail print is not designated is omitted here.

Figure 15B:
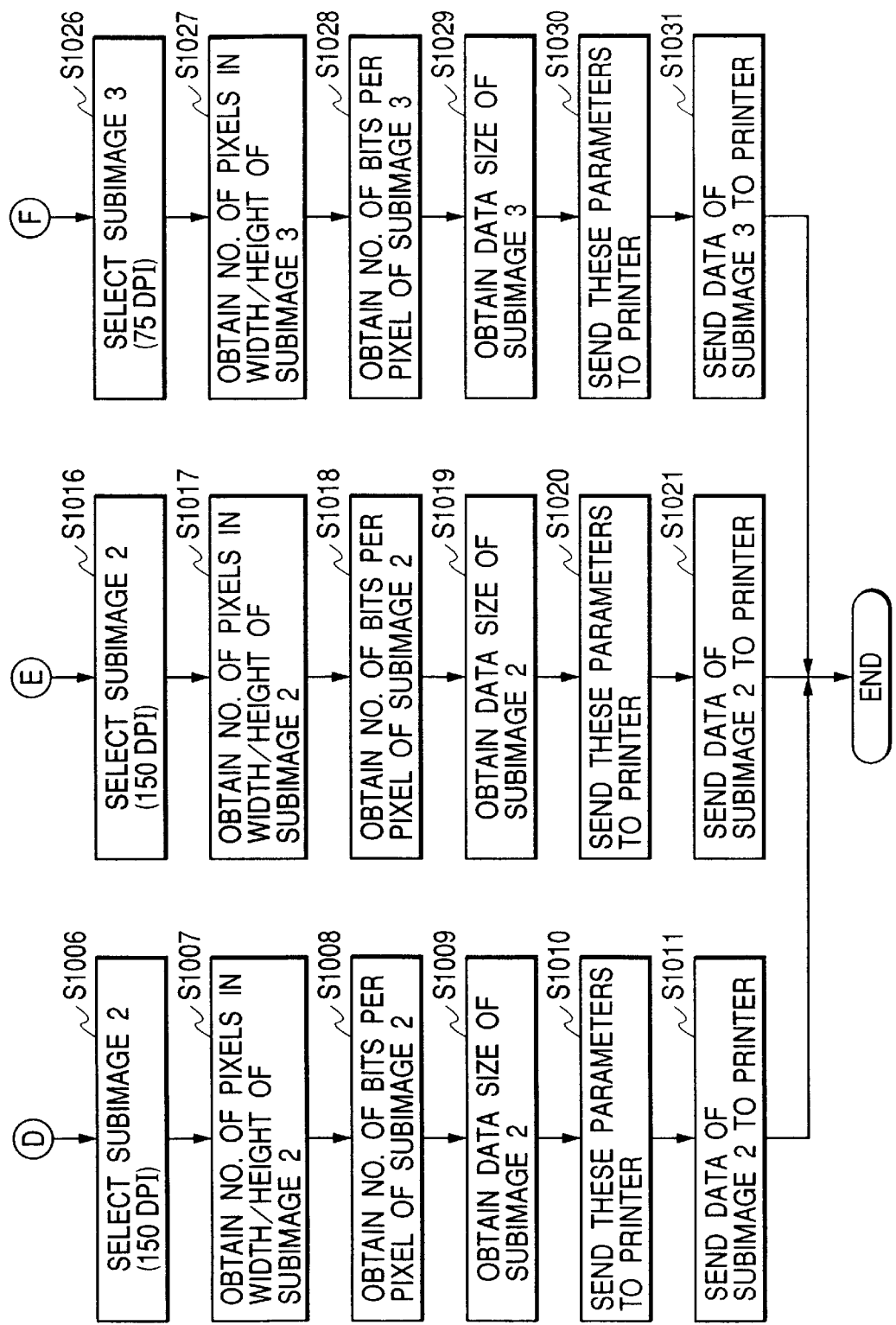
FIG. 15 which is comprised of FIGS. 15A and 15B are flowcharts showing contents of a process to generate a print command of the FPX image portion by the host computer of the print system in the second embodiment.

Processes which are characteristic in the second embodiment and are executed in the host computer when the thumbnail print is designated will now be described hereinbelow with reference to flowcharts of FIGS. 15A and 15B.

The application program 401 inputs the file name of the FPX image, the coordinates of the drawing position on the sheet, and the width and height on the sheet to the operating system 402 (step S1001). In the embodiment, since the application program 401 is not concerned with the thumbnail printing process, the coordinates of the drawing position, the width, and the height which are inputted by the application program 401 are set to the numerical values which are determined on the assumption that one page is printed on one sheet. The operating system 402 sends all of the information inputted in step S1001 to the printer driver 403 (step S1002).

Subsequently, the printer driver opens the FPX file on the basis of the file name of the FPX image sent from the operating system in step S1002 and examines the number of subimages in the FPX file and the resolution of each subimage (S1040). However, in the embodiment as well, it is assumed that the printer driver 403 can identify that the relevant file is the file in which the FPX image has been stored on the basis of, for example, an extension of the file from the file name of the FPX image sent from the operating system 402. It is also assumed that the printer driver 403 can process the data in the file in accordance with the logic structure of the FPX image file as shown in FIG. 16.

The printer driver 403 reads out the number of subimages from the area 1602 where the number of subimages included in the whole FPX image 1601 shown in FIG. 16 has been stored and subsequently sequentially reads the resolutions of the subsequent subimages as many as the number of subimages. In the embodiment, the resolution of each subimage is read out from the area 1603 where the resolution of the subimage 1 has been stored, the area 1604 where the resolution of the subimage 2 has been stored and the area 1605 where the resolution of the subimage n has been stored.

The printer driver 403 examines the number of pages which are arranged in one recording medium and whose number has previously been designated by a processing step (not shown) (step S1003). When the number of pages which are printed in one sheet is equal to 2 in step S1003, the layout location and dimensions are properly re-calculated in accordance with a discrimination result about which designated number of page arranged on the sheet the relevant page is. However, since the rotation is accompanied when two pages are printed, they are re-calculated also in consideration of it (S1004). The reason why the rotating process is performed in case of two pages is because, for example, when the size of the recording medium is equal to A4, it is sufficient to allow the printer driver to operate so as to record each page onto the recording medium of the A5 size, and a major side of the A5 size sheet in this case becomes a minor side of the A4 size sheet, in other words, the image has been rotated by 90°. In case of printing four pages (also including the case of three pages) onto one recording medium, the rotating process is not performed because it is sufficient to equally divide the A4 size sheet into ½ in each of the portrait and landscape directions.

Subsequently, the calculated layout location and dimensions and the presence of the rotation are stored in the fields 602, 603, 604, 605, and 610 in accordance with the logic structure described in FIG. 6, respectively (step S1005). Since the number of pages which are arranged in one recording medium is equal to 2, the subimage 2 of 150 dpi in the FPX image file is selected on the basis of the resolution information of each subimage examined instep S1040 (step S1006).

Subsequently, the printer driver 403 reads out the width and height and the numbers of pixels of the subimage 2 of 150 dpi of the FPX image to be drawn from the FPX file and stores them into the fields 606 and 607 in accordance with the logic structure described in FIG. 6 (step S1007). For this process, it is sufficient to read out desired information from the area 1621 where the width and height of the subimage 2 have been stored while sequentially processing the information in accordance with the logic structure of the FPX image in FIG. 16.

The printer driver 403 obtains the number of bits per pixel of the subimage 2 of 150 dpi of the FPX image to be drawn and stores it into the field 608 in accordance with the logic structure described in FIG. 6 (step S1008). For this process, it is sufficient to read out desired information from the area 1622 where the number of bits per pixel of the subimage 2 has been stored while sequentially processing the information in accordance with the logic structure of the FPX image in FIG. 16. The printer driver 403 obtains the size of whole subimage 2 of 150 dpi of the FPX image to be drawn and stores it into the field 609 in accordance with the logic structure described in FIG. 6 (step S1009). For this process, it is sufficient to read out desired information from the area 1623 where the data size of the subimage 2 has been stored while sequentially processing the information in accordance with the logic structure, of the FPX image in FIG. 16.

The above parameters are sent to the printer 410 via the operating system 402 together with the kind of print command (in this case, "FPX draw command" stored in the field 601) (step S1010). Subsequently, the printer driver reads out the data of the subimage 2 of 150 dpi from the FPX image file and sends it to the printer 410 via the operating system 402 (step S1011). For this process, it is sufficient to read out desired information from the area 1624 where the data of the subimage 2 has been stored while sequentially processing the information in accordance with the logic structure of the FPX image in FIG. 16.

In step S1003, if the number of pages which are printed in one recording medium is equal to 4, the layout location and dimensions are re-calculated in accordance with a discrimination result about which designated number of page arranged on the sheet the relevant page is. However, since the rotation is not accompanied when four pages are printed as mentioned above, they are re-calculated also in consideration of it (S1014).

Subsequently, the calculated layout location and dimensions and the absence of the rotation are stored in the fields 602, 603, 604, 605, and 610 in accordance with the logic structure described in FIG. 6, respectively (step S1015). Since the number of pages which are arranged in one recording paper is equal to 4, the subimage 2 of 150 dpi in the FPX image file is selected on the basis of the resolution information of each subimage examined in step S1040 (step S1016).

The printer driver 403 reads out the numbers of pixels in the width and height of the subimage 2 of 150 dpi of the FPX image to be drawn from the FPX file and stores them into the fields 606 and 607 in accordance with the logic structure described in FIG. 6 (step S1017). For this process, it is sufficient to read out desired information from the area 1621 where the width and height of the subimage 2 have been stored while sequentially processing the information in accordance with the logic structure of the FPX image in FIG. 16. Subsequently, the printer driver 403 obtains the number of bits per pixel of the subimage 2 of 150 dpi of the FPX image to be drawn and stores it into the field 608 in accordance with the logic structure described in FIG. 6 (step S1018). For this process, it is sufficient to read out desired information from the area 1622 where the number of bits per pixel of the subimage 2 has been stored while sequentially processing the information in accordance with the logic structure of the FPX image in FIG. 16.

The printer driver 403 obtains the size of whole subimage of 150 dpi of the FPX image to be drawn and stores it into the field 609 in accordance with the logic structure described in FIG. 6 (step S1019). For this process, it is sufficient to read out desired information from the area 1623 where the data size of the subimage 2 has been stored while sequentially processing the information in accordance with the logic structure of the FPX image in FIG. 16. Subsequently, the above parameters are sent to the printer 410 via the operating system 402 together with the kind of print command (in this case, "FPX draw command" stored in the field 601) (step S1020). The printer driver reads out the data of the subimage 2 of 150 dpi from the FPX image file and sends it to the printer 410 via the operating system 402 (step S1021). For this process, it is sufficient to read out desired information from the area 1624 where the data of the subimage 2 has been stored while sequentially processing the information in accordance with the logic structure of the FPX image in FIG. 16.

When the number of pages which are printed in one recording medium is equal to 8 in step S1003, the layout location and dimensions are properly re-calculated in accordance with a discrimination result about which designated number of page the relevant page is arranged on the sheet. However, since the rotation is accompanied when eight pages are printed, they are re-calculated also in consideration of it (S1024).

Subsequently, the calculated layout location and dimensions and the presence of the rotation are stored in the fields 602, 603, 604, 605, and 610 in accordance with the logic structure described in FIG. 6, respectively (step S1025). Since the number of pages which are arranged in one recording medium is equal to 8, the subimage n of 75 dpi in the FPX image file is selected on the basis of the resolution information of each subimage examined in step S1040 (step S1026).

Subsequently, the printer driver 403 reads out the numbers of pixels in the width and height of the subimage n of 75 dpi of the FPX image to be drawn from the FPX file and stores them into the fields 606 and 607 in accordance with the logic structure described in FIG. 6 (step S1027). For this process, it is sufficient to read out desired information from the area 1631 where the width and height of the subimage n have been stored while sequentially processing the information in accordance with the logic structure of the FPX image in FIG. 16.

Subsequently, the printer driver 403 obtains the number of bits per pixel of the subimage n of 75 dpi of the FPX image to be drawn and stores it into the field 608 in accordance with the logic structure described in FIG. 6 (step S1028). For this process, it is sufficient to read out desired information from the area 1632 where the number of bits per pixel of the subimage n has been stored while sequentially processing the information in accordance with the logic structure of the FPX image in FIG. 16. The printer driver 403 obtains the size of whole subimage n of 75 dpi of the FPX image to be drawn and stores it into the field 609 in accordance with the logic structure described in FIG. 6 (step S1029). For this process, it is sufficient to read out desired information from the area 1633 where the data size of the subimage n has been stored while sequentially processing the information in accordance with the logic structure of the FPX image in FIG. 16. Subsequently, the above parameters are sent to the printer 410 via the operating system 402 together with the kind of print command (in this case, "FPX draw command" stored in the field 601) (step S1030). The printer driver reads out the data of the subimage n of 75 dpi from the FPX image file and sends it to the printer 410 via the operating system 402 (step S1031). For this process, it is sufficient to read out desired information from the area 1634 where the data of the subimage n has been stored while sequentially processing the information in accordance with the logic structure of the FPX image in FIG. 16.

Processes for receiving the print command, converting it to the draw command, and storing it on the printer 410 side will now be described.

The processes in this portion are almost similar to those disclosed in the first embodiment except for a different point that there is a case where the rotation is accompanied in dependence on an image. More specifically speaking, the rotation is accompanied when the number of pages which are printed in one recording medium is equal to 2 or 8 in the second embodiment. Since the print command which is sent from the host computer 400 is accompanied with identification information indicative of the presence or absence of the rotation, it is sufficient that on the printer 410 side, the presence or absence of the rotating process is stored together in the process corresponding to step S707 on the basis of the identification information. Its detailed explanation is omitted here.

Processes such that the drawer 407 reads the draw command from the draw command memory 406 and draws it will now be described. The processes in this portion are almost similar to those disclosed in the first embodiment except for a different point that there is a case where the rotation is accompanied in dependence on an image. Since the presence or absence of the rotation of the image has been designated in the process corresponding to step S707 in the first embodiment as mentioned above, it can be discriminated on the basis of this information. It will be obviously understood that the image rotating process can be realized by exchanging the dimensions in the width and height directions and properly reading out and processing the data in association with it. Its detailed description is omitted here.

As described above, by constructing the print system as shown in the first embodiment, the resolution of the image according to the data format such that the image data of a plurality of resolutions are layered and handled can be set to a predetermined resolution in accordance with the print purpose. Therefore, in a print output mode in which a high quality is not requested, the subimage of a lower resolution can be selected for the purpose of printing the image which conforms with the data format in which the image data of a plurality of resolutions are layered and handled. Thus, a size of memory area which is necessary as a draw command memory can be saved and the realization of a high processing speed can be expected. It is also possible to suppress the occurrence of a state where the resolutions of the portions other than the image which conforms with the data format in which the image data of a plurality of resolutions are layered and handled have to be reduced.

By constructing the print system as shown in the second embodiment, the resolution of the image which conforms with the data format in which the image data of a plurality of resolutions are layered and handled can be set to a predetermined resolution in the thumbnail print mode. Therefore, in the thumbnail print mode, the subimage of a lower resolution can be selected for the purpose of printing the image which conforms with the data format in which the image data of a plurality of resolutions are layered and handled. Thus, a size of memory area which is necessary as a draw command memory can be saved and the realization of a high processing speed can be expected. It is also possible to suppress the occurrence of a state where the resolutions of the portions other than the image which conforms with the data format in which the image data of a plurality of resolutions are layered and handled have to be reduced.

Moreover, since the image of a lower resolution which is selectively used in the image which conforms with the data format in which the image data of a plurality of resolutions are layered and handled relates to the data of the resolution provided as a subimage, the resolution converting process or the like is unnecessary. Consequently, there is also an advantage such that the processes are relatively light processes in terms of the computer resources and the processing time is short.

Third Embodiment

A drawing process of the FPX image which is executed when an HTML print is designated from a browser will now be described as a third embodiment of the invention. Since a print system, which will be explained in the third embodiment, can be also realized by a block construction similar to hardware (software regarding the processes obviously differs) similar to that of the conventional print system described in FIG. 4, it will be explained hereinbelow with reference to FIG. 4.

Since the browser is one of the applications, the application 401 is referred to as a browser 401 in the third embodiment.

In case of printing an HTML document from the browser 401, a path of storage means in which an image file has been stored together with the image used in the HTML is designated as a link in the operating system. Although such a link and a tag of the image exist as data in the HTML, when it is actually displayed or printed and outputted, it is not visualized. When a print instruction is issued (412), the printer driver 403 analyzes the contents in the HTML. When an image is found out in the document, the path in which the image file corresponding to this image has been stored is obtained. The printer driver 403 discriminates the kind of original image file of the image by analyzing the path. For example, when the path is "c:¥windows¥Temporary Internet Files¥cache1¥001.fpx", it is possible to determine that the image file conforms with the FPX format and has a plurality of layers. When it is decided that the image file has a plurality of layers, the image file stored in the host computer 400 is obtained on the basis of the path of the image file and the file is opened. As described in the first embodiment, the image of the suitable layer is obtained in accordance with the print purpose and the print command to which necessary information has been added is generated.

In the embodiment, although the size of image of the image data having a plurality of layers has been expressed by the resolution, the size of image of the image data can be discriminated by the number of pixels as it is. That is, since the print resolution is determined in accordance with the print purpose, the printer driver 403 obtains the necessary numbers of pixels on the basis of the X and Y coordinates, the width, and the height on the sheet of the image designated from the application 401. When the print purpose is "text/table", the printer driver 403 sets the print resolution to 600 dpi and selects the FPX image that is nearest to the calculated necessary number of pixels. When the print purpose is "DTP", the print resolution is set to 600 dpi and the FPX image that is nearest to the half of the necessary number of pixels calculated is selected. When the print purpose is "quick text", the print resolution is set to 300 dpi and the FPX image that is nearest to the necessary number of pixels calculated at 300 dpi is selected. When the print purpose is "quick DTP", the print resolution is set to 300 dpi and the FPX image that is nearest to the half of the necessary number of pixels calculated at 300 dpi is selected. When the print purpose is "save toner", the print resolution is set to 300 dpi and the FPX image that is nearest to ¼ of the necessary number of pixels calculated at 300 dpi is selected.

Since the browser 401 generally outputs the image used in the document as it is to the operating system upon printing, when the print data using the image received by the printer driver is generated, a data amount of the print data increases, a work memory such as a draw command memory 406 or the like of the printer is insufficient. There is a possibility that the print resolution deteriorates or the printing process cannot be performed.

Therefore, even for the application 401 like a browser as mentioned above such that the image of the image file is sent as it is, the printer driver 403 generates the print data by using the image data of a proper size. There is, consequently, an effect that a situation that the work memory is insufficient in the printer extremely decreases and a situation that the print resolution becomes lower than a desired value of the user is avoided.

Although the case where the FlashPix format is used as an image file having a plurality of layers has been described in the first to third embodiments, the kind of file is not limited to it but an image file of a format such that images of a plurality of different resolutions can be generated like a JBIG format or Jpeg2000 format can be also used.

An electronic computer as a host computer in the embodiments can be constructed by a general information processing apparatus such as a usual personal computer or the like. The object of the invention can be also obviously accomplished by a method whereby the memory medium on which program codes of the software to realize the functions of the embodiments mentioned above have been recorded is supplied to a system or an apparatus and a computer (or a CPU or an MPU) of the system or an apparatus reads out and executes the program codes stored in the memory medium.

In this case, the program codes themselves read out from the memory medium realize the functions of the embodiments mentioned above and the memory medium in which the program codes have been stored constructs the invention.

As a memory medium to supply the program codes, for example, a floppy disk, a hard disk, an optical disk, a magnetooptic disk, a CD-ROM, a CD-R, a magnetic tape, a nonvolatile memory card, an ROM, or the like can be used.

The invention incorporates not only a case where the functions of the embodiments mentioned above are realized by executing the program codes read out by the computer but also a case where the OS (Operating System) or the like which is operating on the computer executes a part or all of the actual processes on the basis of instructions of the program codes and the functions of the embodiments mentioned above are realized by those processes.

Further, the invention also incorporates a case where the program codes read out from the memory medium are written into a memory provided for a function expanding board inserted into a computer or a function expanding unit connected to the computer and, after that, a CPU or the like provided for the function expanding board or function expanding unit executes a part or all of the actual processes on the basis of instructions of the program codes, and the functions of the embodiments mentioned above are realized by those processes.

To realize the functions and processes of the invention by a computer, the program codes themselves which are installed in the computer realize the invention. That is, the computer programs themselves to realize the functions and processes of the invention are also incorporated in the invention.

A method of supplying the computer program is not limited to a case where it is stored in an FD or CD-ROM and read out by the computer and installed in the computer as mentioned above. The computer program can be also supplied by a method whereby a client computer is connected to a homepage of the Internet by using a browser of the client computer and the computer program itself of the invention is downloaded from the homepage or a compressed file including an automatic installing function is downloaded. The functions of the embodiments can be also realized by a method whereby the program codes constructing the program of the invention are divided into a plurality of files and each file is downloaded from a different homepage. That is, a WWW server for downloading a program file to realize the functions and processes of the invention by a computer to a plurality of users is also incorporated in the invention.

The functions of the embodiments can be also realized by a method whereby the program of the invention is enciphered, stored, in the memory medium such as an FD or the like, and distributed to the user, key information to decrypt the encipherment is downloaded from the homepage through the Internet to the user who fulfilled predetermined conditions, and the enciphered program is executed by using the key information and installed to a computer.

According to the construction of the invention as described above, in the case where an image exists in text data as a print target, the quality of the data which is outputted to the printer can be designated as print data corresponding to the image.

According to another invention, in case of printing a plurality of pages to one recording medium, the thumbnail image that is printed can be designated in accordance with the number of pages.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus that serves as a host computer for outputting print data regarding text data whose print has been instructed to a printer, comprising:

storage holding means for storing and holding a plurality of image data of different resolutions;

designating means for designating a print quality;

specifying means for specifying locations of said storage holding means at which a plurality of image data of different resolutions for an image instructed by an application to be printed are stored;

selecting means for selecting the image data of the resolution according to the print quality designated by said designating means from among the plurality of image data for the instructed image stored in said storage holding means at the locations specified by said specifying means; and output means for outputting the image data selected by said selecting means to said printer by a predetermined format.

2. An apparatus according to claim 1, wherein said storage holding means stores the image data of each resolution as a layer structure.

3. An apparatus according to claim 1, wherein the print data that is outputted by said output means is outputted by a format described by a page description language which can be interpreted by said printer.

4. An apparatus according to claim 1, wherein said selecting means selects the image data of a higher resolution as the print quality designated by said designating means is higher.

5. An information processing apparatus according to claim 1, further comprising print purpose designating means for designating a print purpose of a text to be printed, wherein said designating means designates a print quality of the text to be printed in accordance with the print purpose designated by said print purpose designating means.

6. An information processing apparatus according to claim 1, wherein said apparatus has a function to print a plurality of reduced pages onto one recording medium, further comprising setting means for setting the number of pages which are printed to said one recording medium, wherein said selecting means selects thumbnail image data of the corresponding resolution from said storage holding means on the basis of the number of print pages set by said setting means in the case where a thumbnail is designated as image data to be printed.

7. An information processing apparatus according to claim 5, further comprising resolution determining means for determining a print resolution of the text to be printed and an image resolution of an image in the text of a value that is independent of said print resolution in accordance with the print purpose designated by said print purpose designating means, wherein said selecting means selects the image data corresponding to the image resolution determined by said resolution determining means from said storage holding means in the case where an image exists in the text to be printed.

8. An information processing apparatus for generating print data which can be interpreted by a printer, comprising:

print purpose designating means for designating a print purpose of data to be printed;

discriminating means for, in the case where a print instruction of HTML data is received from an application, discriminating whether an image used in said HTML data is an image file from which images of a plurality of layers can be obtained or not;

obtaining means for, in the case where it is determined by said discriminating means that said image is the image file from which the images of said plurality of layers can be obtained, selecting and obtaining the image of the suitable layer from said image file in accordance with the print purpose designated by said print purpose designating means; and generating means for generating print data on the basis of the image obtained by said obtaining means and said HTML data.

9. An apparatus according to claim 8, wherein said discriminating means specifies a kind of the image file from information indicative of a link destination of the image used in said HTML data, thereby discriminating whether said image is the image file from which the images of said plurality of layers can be obtained or not.

10. An information processing method of outputting print data regarding text data whose print has been instructed to a printer, comprising:

a storage holding step of storing and holding a plurality of image data of different resolutions into storage holding means;

a designating step of designating a print quality;

a specifying step of specifying locations of said storage holding means at which a plurality of image data of different resolutions for an image instructed by an application to be printed are stored;

a selecting step of selecting the image data of the resolution according to the print quality designated in said designating step from among the plurality of image data for the instructed image stored in said storage holding means at the locations specified in said specifying step; and an outputting step of outputting the image data selected in said selecting step to said printer by a predetermined format.

11. A method according to claim 10, wherein in said storage holding step, the image data of each resolution is stored as a layer structure.

12. A method according to claim 10, wherein the print data that is outputted in said outputting step is outputted by a format described by a page description language which can be interpreted by said printer.

13. A method according to claim 10, wherein in said selecting step, the image data of a higher resolution is selected as the print quality designated in said designating step is higher.

14. An information processing method according to claim 10, further comprising a print purpose designating step of designating a print purpose of a text to be printed, wherein said designating step designates a print quality of the text to be printed in accordance with the print purpose designated in said print purpose designating step.

15. An information processing method according to claim 10, wherein said method has a function to print a plurality of reduced pages onto one recording medium, further comprising a setting step of setting the number of pages which are printed to said one recording medium, wherein said selecting step selects thumbnail image data of the corresponding resolution from said storage holding means on the basis of the number of print pages set in said setting step in the case where a thumbnail is designated as image data to be printed.

16. An information processing method according to claim 14, further comprising a resolution determining step of determining a print resolution of the text to be printed and an image resolution of an image in the text of a value that is independent of said print resolution in accordance with the print purpose designated in said print purpose designating step, wherein said selecting step selects the image data corresponding to the image resolution determined in said resolution determining step from said storage holding means in the case where an image exists in the text to be printed.

17. An information processing method of generating print data which can be interpreted by a printer, comprising:
   a print purpose designating step of designating a print purpose of data to be printed;
   a discriminating step of, in the case where a print instruction of HTML data is received from an application, discriminating whether an image used in said HTML data is an image file from which images of a plurality of layers can be obtained or not;
   an obtaining step of, in the case where it is determined in said discriminating step that said image is the image file from which the images of said plurality of layers can be obtained, selecting and obtaining the image of the suitable layer from said image file in accordance with the print purpose designated in said print purpose designating step; and
   a generating step of generating print data on the basis of the image obtained in said obtaining step and said HTML data.

18. A method according to claim 17, wherein in said discriminating step, a kind of the image file is specified from information indicative of a link destination of the image used in said HTML data, thereby discriminating whether said image is the image file from which the images of said plurality of layers can be obtained or not.

19. A computer-readable memory medium which stores a computer program for outputting print data regarding text data whose print has been instructed to a printer, wherein said program comprises:
   a storage holding step of storing and holding a plurality of image data of different resolutions into storage holding means;
   a designating step of designating a print quality;
   a specifying step of specifying locations of said storage holding means at which a plurality of image data of different resolutions for an image instructed by an application to be printed are stored;
   a selecting step of selecting the image data of the resolution according to the print quality designated in said designating step from among the plurality of image data for the instructed image stored in said storage holding means at the locations specified in said specifying step; and
   an outputting step of outputting the image data selected in said selecting step to said printer by a predetermined format.

20. A medium according to claim 19, wherein in said storage holding step, the image data of each resolution is stored as a layer structure.

21. A medium according to claim 19, wherein the print data that is outputted in said outputting step is outputted by a format described by a page description language which can be interpreted by said printer.

22. A medium according to claim 19, wherein in said selecting step, the image data.of a higher resolution is selected as the print quality designated in said designating step is higher.

23. A computer-readable memory medium according to claim 19, further comprising a print purpose designating step of designating a print purpose of a text to be printed, wherein said designating step designates a print quality of the text to be printed in accordance with the print purpose designated in said print purpose designating step.

24. A computer-readable memory medium according to claim 19, wherein said memory medium has a function to print a plurality of reduced pages onto one recording medium, further comprising a setting step of setting the number of pages which are printed to said one recording medium, wherein said selecting step selects thumbnail image data of the corresponding resolution from said storage holding means on the basis of the number of print pages set in said setting step in the case where a thumbnail is designated as image data to be printed.

25. A computer-readable memory medium according to claim 23, further comprising a resolution determining step of determining a print resolution of the text to be printed and an image resolution of an image in the text of a value that is independent of said print resolution in accordance with the print purpose designated in said print purpose designating step, wherein said selecting step selects the image data corresponding to the image resolution determined in said resolution determining step from said storage holding means in the case where an image exists in the text to be printed.

26. A computer-readable memory medium which stores a computer program for generating print data which can be interpreted by a printer, wherein said program comprises:
   a print purpose designating step of designating a print purpose of data to be printed;
   a discriminating step of, in the case where a print instruction of HTML data is received from an application, discriminating whether an image used in said HTML data is an image file from which images of a plurality of layers can be obtained or not;
   an obtaining step of, in the case where it is determined in said discriminating step that said image is the image file from which the images of said plurality of layers can be obtained, selecting and obtaining the image of the suitable layer from said image file in accordance with the print purpose designated in said print purpose designating step; and
   a generating step of generating print data on the basis of the image obtained in said obtaining step and said HTML data.

27. A medium according to claim 26, wherein in said discriminating step, a kind of the image file is specified from information indicative of a link destination of the image used in said HTML data, thereby discriminating whether said image is the image file from which the images of said plurality of layers can be obtained or not.

28. A program for outputting print data regarding text data whose print has been instructed to a printer, wherein said program comprises:
   a storage holding step of storing and holding a plurality of image data of different resolutions into storage holding means;
   a designating step of designating a print quality;
   a specifying step of specifying locations of said storage holding means at which a plurality of image data of different resolutions for an image instructed by an application to be printed are stored;
   a selecting step of selecting the image data of the resolution according to the print quality designated in said designating step from among the plurality of image data for the instructed image stored in said storage holding means at the locations specified in said specifying step; and an outputting step of outputting the image data selected in said selecting step to said printer by a predetermined format.

29. A program according to claim 28, wherein in said storage holding step, the image data of each resolution is stored as a layer structure.

30. A program according to claim 28, wherein the print data that is outputted in said outputting step is outputted by a format described by a page description language which can be interpreted by said printer.

31. A program according to claim 28, wherein in said selecting step, the image data of a higher resolution is selected as the print quality designated in said designating step is higher.

32. A program according to claim 28, wherein said program has a function to print a plurality of reduced pages onto one recording medium, further comprising a setting step of setting the number of pages which are printed to said one recording medium, wherein said selecting step selects thumbnail image data of the corresponding resolution from said storage holding means on the basis of the number of print pages set in said setting step in the case where a thumbnail is designated as image data to be printed.

33. A program according to claim 28, further comprising a print purpose designating step of designating a print purpose of a text to be printed, wherein said designating step designates a print quality of the text to be printed in accordance with the print purpose designated in said print purpose designating step.

34. A program according to claim 33, further comprising a resolution determining step of determining a print resolution of the text to be printed and an image resolution of an image in the text of a value that is independent of said print resolution in accordance with the print purpose designated in said print purpose designating step, wherein said selecting step selects the image data corresponding to the image resolution determined in said resolution determining step from said storage holding means in the case where an image exists in the text to be printed.

35. A program for generating print data which can be interpreted by a printer, wherein said program comprises:

a print purpose designating step of designating a print purpose of data to be printed;

a discriminating step of, in the case where a print instruction of HTML data is received from an application, discriminating whether an image used in said HTML data is an image file from which images of a plurality of layers can be obtained or not;

an obtaining step of, in the case where it is determined in said discriminating step that said image is the image file from which the images of said plurality of layers can be obtained, selecting and obtaining the image of the suitable layer from said image file in accordance with the print purpose designated in said print purpose designating step; and a generating step of generating print data on the basis of the image obtained in said obtaining step and said HTML data.

36. A program according to claim 35, wherein in said discriminating step, a kind of the image file is specified from information indicative of a link destination of the image used in said HTML data, thereby discriminating whether said image is the image file from which the images of said plurality of layers can be obtained or not.

* * * * *

UNITED STATES PATENT AND TRADEMARK OFFICE
CERTIFICATE OF CORRECTION

PATENT NO. : 6,597,471 B1
DATED : July 22, 2003
INVENTOR(S) : Yoshikawa

It is certified that error appears in the above-identified patent and that said Letters Patent is hereby corrected as shown below:

Column 1,
Line 49, "those" should read -- that --.

Column 5,
Line 30, "page,size" should read -- page size --;
Line 38, "Kodak©" should read -- Kodak --; and
Line 65, "attribute, information" should read -- attribute information --.

Column 7,
Line 47, "titles" should read -- tiles --; and
Line 56, "international-standardized" should read -- internationally-standardized --.

Column 8,
Line 44, "cannot,be" should read -- cannot be --.

Column 9,
Line 37, "are" should be deleted;
Line 38, "showing" should read -- shows --; and
Line 64, "are" should read -- depicts --.

Column 12,
Line 10, "afield" should read -- a field --; and
Line 35, "figure," should read -- figures, --.

Column 19,
Line 20, "instep" should read -- in step --.

UNITED STATES PATENT AND TRADEMARK OFFICE
CERTIFICATE OF CORRECTION

PATENT NO.    : 6,597,471 B1
DATED         : July 22, 2003
INVENTOR(S)   : Yoshikawa It is certified that error appears in the above-identified patent and that said Letters Patent is hereby corrected as shown below:

Column 24,
Line 52, "stored,in" should read -- stored in --.

Column 27,
Line 65, "data.of" should read -- data of --.

Signed and Sealed this

Seventh Day of September, 2004

JON W. DUDAS
*Director of the United States Patent and Trademark Office*